United States Patent
Brown et al.

(10) Patent No.: US 9,800,411 B1
(45) Date of Patent: Oct. 24, 2017

(54) USING A SECRET GENERATOR IN AN ELLIPTIC CURVE CRYPTOGRAPHY (ECC) DIGITAL SIGNATURE SCHEME

(71) Applicant: ISARA Corporation, Waterloo (CA)

(72) Inventors: Michael Kenneth Brown, Fergus (CA); Gustav Michael Gutoski, Waterloo (CA); Marinus Struik, Toronto (CA); Atsushi Yamada, Toronto (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/147,845

(22) Filed: May 5, 2016

(51) Int. Cl.
*H04L 9/30* (2006.01)
*H04L 9/32* (2006.01)
*H04L 29/06* (2006.01)
*G06F 21/64* (2013.01)
*G06F 21/72* (2013.01)
*H04W 12/06* (2009.01)

(52) U.S. Cl.
CPC .......... *H04L 9/3066* (2013.01); *G06F 21/64* (2013.01); *G06F 21/72* (2013.01); *H04L 9/30* (2013.01); *H04L 9/32* (2013.01); *H04L 9/3247* (2013.01); *H04L 63/0442* (2013.01); *H04L 63/083* (2013.01); *H04W 12/06* (2013.01)

(58) Field of Classification Search
CPC . H04L 9/30; H04L 9/325; H04L 9/323; H04L 9/306; H04L 9/307; H04L 9/347; H04L 9/0883; H04L 9/3066; H04L 9/32; H04L 9/3247; H04L 63/0442; H04L 63/083; H04W 12/06; G06F 21/72; G06F 21/64
See application file for complete search history.

(56) References Cited

U.S. PATENT DOCUMENTS

| 5,825,880 A * | 10/1998 | Sudia | G06F 21/40 380/286 |
|---|---|---|---|
| 6,252,960 B1 | 6/2001 | Seroussi | |
| 6,411,715 B1 * | 6/2002 | Liskov | H04L 9/002 380/1 |
| 7,516,321 B2 * | 4/2009 | Chen | H04L 9/3073 380/259 |
| 7,599,491 B2 | 10/2009 | Lambert | |

(Continued)

OTHER PUBLICATIONS

Karatop, Ayşe Gül, and Erkay Savş. "An identity-based key infrastructure suitable for messaging and its application to e-mail." Proceedings of the 4th international conference on Security and privacy in communication netowrks. ACM, 2008.*

(Continued)

*Primary Examiner* — Kari Schmidt
(74) *Attorney, Agent, or Firm* — Henry Patent Law Firm PLLC

(57) ABSTRACT

In a general aspect, a secret generator is used in an elliptic curve cryptography (ECC) scheme. In some aspects, an elliptic curve subgroup is specified by a public generator of an ECC system, and the secret generator is an element of the elliptic curve subgroup. In some instances, the secret generator is used to generate an ECC key pair that includes a public key and a private key, and the private key is used to generate a digital signature based on a message. In some instances, the public key and the secret generator are used to verify the digital signature.

16 Claims, 10 Drawing Sheets

(56) References Cited

U.S. PATENT DOCUMENTS

| | | | |
|---|---|---|---|
| 8,073,139 B2 | 12/2011 | Vanstone et al. | |
| 8,452,017 B2 | 5/2013 | Sherkin | |
| 8,745,376 B2* | 6/2014 | Zaverucha | H04L 9/3066 |
| | | | 713/156 |
| 9,455,832 B2* | 9/2016 | Brown | H04L 9/3066 |
| 2002/0044649 A1* | 4/2002 | Gallant | G06F 7/725 |
| | | | 380/30 |
| 2002/0172356 A1* | 11/2002 | Ono | G06F 7/723 |
| | | | 380/28 |
| 2003/0194086 A1* | 10/2003 | Lambert | G06F 7/725 |
| | | | 380/44 |
| 2005/0193203 A1* | 9/2005 | Freeman | H04L 63/0442 |
| | | | 713/171 |
| 2006/0153365 A1* | 7/2006 | Beeson | H04L 9/3066 |
| | | | 380/30 |
| 2007/0064932 A1* | 3/2007 | Struik | G06F 7/725 |
| | | | 380/30 |
| 2009/0010428 A1* | 1/2009 | Delgosha | H04L 9/3093 |
| | | | 380/30 |
| 2010/0023775 A1* | 1/2010 | Vanstone | H04L 9/3066 |
| | | | 713/176 |
| 2010/0111296 A1* | 5/2010 | Brown | H04L 9/0643 |
| | | | 380/28 |
| 2010/0131756 A1* | 5/2010 | Schneider | G06F 21/31 |
| | | | 713/155 |
| 2011/0087884 A1* | 4/2011 | Ho | H04L 9/0844 |
| | | | 713/168 |
| 2011/0113253 A1* | 5/2011 | Volkovs | H04L 9/002 |
| | | | 713/176 |
| 2012/0233457 A1 | 9/2012 | Zaverucha | |
| 2013/0097420 A1 | 4/2013 | Zaverucha | |
| 2013/0179691 A1* | 7/2013 | Naito | H04L 9/3252 |
| | | | 713/176 |
| 2013/0218937 A1* | 8/2013 | Naito | H04L 9/3066 |
| | | | 708/208 |
| 2014/0019766 A1* | 1/2014 | Takahashi | H04L 9/3231 |
| | | | 713/176 |
| 2014/0282957 A1* | 9/2014 | Thakore | H04L 63/0823 |
| | | | 726/7 |
| 2014/0365779 A1 | 12/2014 | Brown et al. | |
| 2016/0087802 A1* | 3/2016 | Peeters | G06F 7/725 |
| | | | 713/176 |
| 2017/0093564 A1* | 3/2017 | Bernat | H04L 9/085 |

OTHER PUBLICATIONS

J. Blömer and P. Günther, "Singular Curve Point Decompression Attack," 2015 Workshop on Fault Diagnosis and Tolerance in Cryptography (FDTC), Saint Malo, 2015, pp. 71-84.*

Barker, et al., NIST SP 800-56A Revision 2, Recommendation for Pair-Wise Key Establishment Schemes Using Discrete Logarithm Cryptography, dated May 2013, 138 pages.; National Institute of Standards and Technology; U.S. Department of Commerce; Washington, DC; US.

Bernstein, et al. Post-Quantum Cryptography,2009, 248 pages, Springer-Verlag, Berlin; DE.

Bernstein, et al., High-speed high-security signatures, dated Sep. 2011, 23 pages.

Certicom Corp; Standard for Efficient Criyptography (SEC1): Elliptic Curve Cryptography, Version 2.0, Standards for Efficient Cryptography, Brown, 2009; 144 pages; Certicom Corp; Mississauga, ON; CA.

Hankerson et al, Guide to Elliptic Curve Cryptography; 2004; SpringerVerlag; NY; US; 332 pages.

IEEE Std 1363, 2000. "IEEE Standard Specifications for Public-Key Cryptography," IEEE Computer Society, Aug. 2000, 236 pages; Institute of Electrical and Electronics Engineers, Inc.; New York, US.

IEEE Std 1363.2, 2008. "IEEE Standard Specifications for Password-Based Public Key Cryptography Techniques," Jan. 2009, 139 pages, Institute of Electrical and Electronics Engineers, Inc.; New York, US.

Information Technology Laboratory, National Institute of Standards and Technology; FIPS PUB 186-3, Digital Signature Standard (DSS), NIST, Jun. 2009; U.S. Department of Commerce; US; 130 pages.

Internet Engineering Taskforce; RFC 7292, PKCS #12: Personal Information Exchange Syntax v1.1, IETF, 2014; Fremont, CA; US; 29 pages.

Josefsson, et al., Edward-curve Digital Signature Algorithm (EdDSA), dated Dec. 9, 2015, 31 pages; IETF Trust, Weston, VA; US.

Kaye et al; An Introduction to Quantum Computing, 2007 & 2010; 287 pages; Oxford University Pressi; Oxford, GB.

Krawczyk, et al., HMAC-based Extract-and-Expand Key Derivation Function (HKDF), IETF RFC 5869 (HKDF), dated May 2010, 14 pages; Internet Engineering Task Force; Fremont, CA; US.

Menezes, et al., Chapter 4—Public Key Parameters, Handbook of Applied Cryptography, 1997, 37 pages; CRC Press, Inc.; CA.

Menezes, et al., Chapter 11—Digital Signatures, Handbook of Applied Cryptography, CRC Press, Inc., 1997, 65 pages.

Wikipedia, Schnorr signature, URL: https://en.wikipedia.org/wiki/Schnorr_signature, dated Feb. 16, 2016, 3 pages; Wikipedia, Inc.; US.

European Telecommunications Standards Institute (ETSI); Quantum Safe Cryptography and Security, ETSI White Paper No. 8, Jun. 2015, France, 64 pages.

* cited by examiner

USING A SECRET GENERATOR IN AN ELLIPTIC CURVE CRYPTOGRAPHY (ECC) DIGITAL SIGNATURE SCHEME

BACKGROUND

The following description relates to using a secret generator in an Elliptic Curve Cryptography (ECC) digital signature scheme.

Elliptic Curve Cryptography (ECC) digital signature schemes have been used to authenticate messages, for example, in public communication systems. In a typical ECC digital signature scheme, a message sender signs the message using the sender's private key, and the message recipient authenticates the message using the signature and the sender's public key. Examples of ECC digital signature schemes include ECDSA (Elliptic Curve Digital Signature Algorithm), ECNR (Elliptic Curve Nyberg Rueppel), ECPVS (Elliptic Curve Pintsov Vanstone Signatures), ECQV (Elliptic Curve Qu Vanstone) and EdDSA (Edwards-curve Digital Signature Algorithm).

DETAILED DESCRIPTION

In some aspects of what is described here, a cryptosystem can resist certain attacks by quantum computers or other types of quantum-enabled technologies. With the development of quantum computing, some cryptosystems may become vulnerable to an adversary who has a quantum computer that can compromise security, for example, by solving an integer factoring or a discrete log problem in polynomial time. Information security provided by a cryptosystem can be improved, in some cases, by reducing or eliminating certain vulnerabilities to quantum-enabled attacks.

In some implementations, additional security measures can be incorporated into existing cryptosystems, or new cryptosystems can be designed with quantum-resistant security features. In some examples, an elliptic curve cryptography (ECC) system that is known to be secure against classical adversaries can be modified to be secure against quantum adversaries. For instance, an ECC digital signature scheme can leverage the security provided by conventional systems while providing security against quantum-enabled attacks that could compromise the conventional systems.

As an example, the security of conventional elliptic curve cryptography (ECC) digital signature algorithms is based at least partially on the hardness of the elliptic curve discrete log problem, which is thought to be infeasible to solve by existing classical computers. In some instances, such ECC digital signature algorithms can be modified to thwart attacks by quantum computers that can solve the elliptic curve discrete log problem in polynomial time (e.g., using Shor's algorithm).

In some implementations, an ECC digital signature scheme uses a secret generator, and the secret generator is an element of an elliptic curve cyclic subgroup. For example, the secret generator can be an element of an elliptic curve prime order cyclic subgroup, which may be defined by a fixed public generator of an ECC cryptography system. Entities who share the secret generator (as well as other information, such as, for example, public system parameters, public keys and possibly other information) can use the ECC digital signature scheme in a manner that is secure against entities who do not know the secret generator. For instance, in some cases, even quantum-enabled adversaries cannot compromise security of the ECC digital signature scheme.

Figure 1:
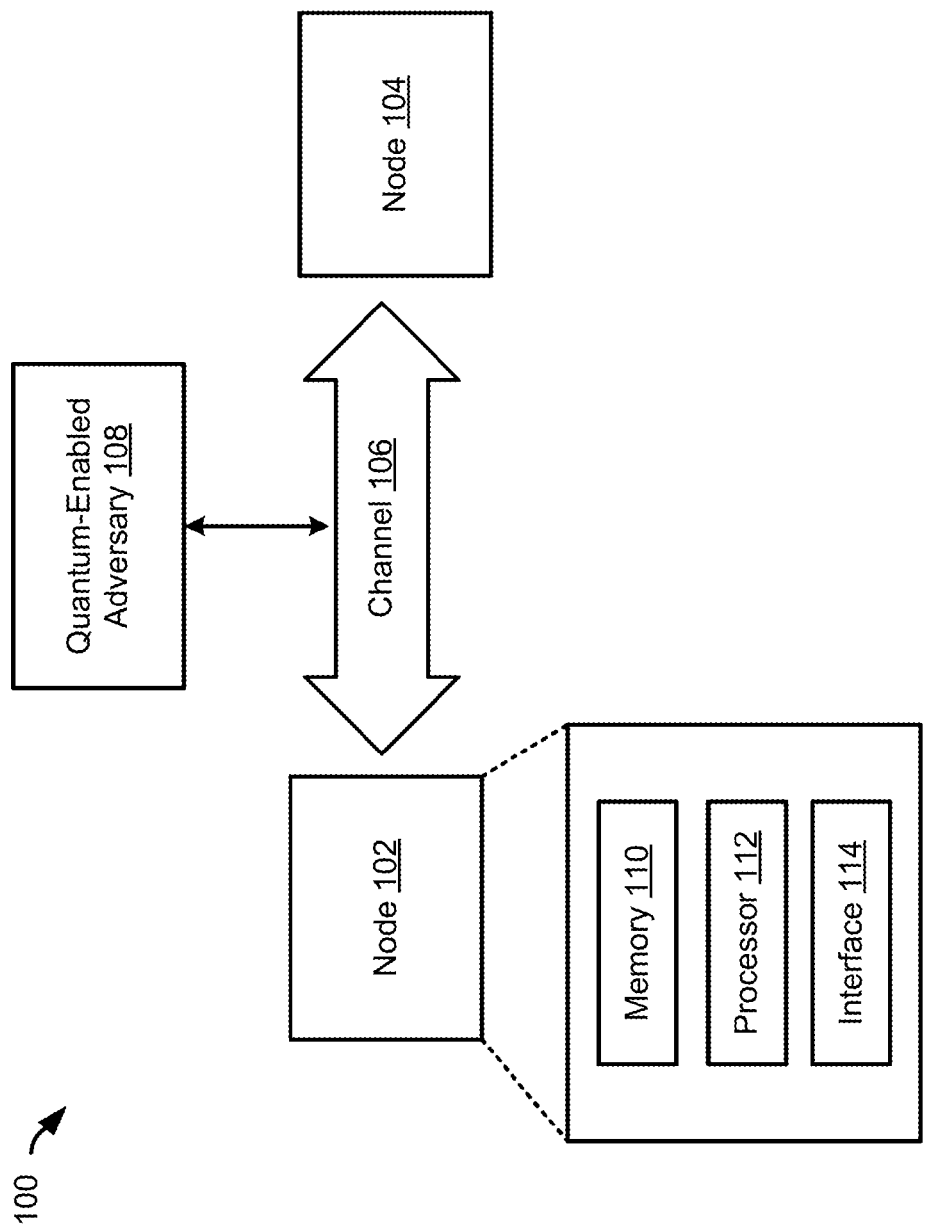
FIG. 1 is a block diagram showing aspects of an example communication system.

FIG. 1 is a block diagram showing aspects of an example communication system 100. The example communication system 100 shown in FIG. 1 includes a two nodes 102, 104 that use a cryptographic scheme to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 have computational resources (e.g., hardware, software, firmware) used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in any of FIGS. 2-10.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in any of FIGS. 2-10.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptography protocols that cannot be compromised by the example quantum-enabled adversary 108. For instance, the nodes 102, 104 may use a cryptography protocol that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some examples, the nodes 102, 104 can use the example techniques shown in any one or more of FIGS. 2-10, or the nodes 102, 104 may use variations of these and other techniques to communicate on the channel 106.

In some implementations, the nodes 102, 104 use an elliptic curve cryptography (ECC) digital signature scheme in their communications over the channel 106. In some ECC schemes, information is encoded in elliptic curve points in an elliptic curve group. An elliptic curve group can be described in terms of a solution to an equation over a finite field, for example, a prime finite field or a characteristic-two extension field. Each point in the elliptic curve group is a pair of field elements corresponding to a solution to an elliptic curve equation. The elliptic curve group also includes an identity element. As a particular example, let $\mathbb{F}_p$ represent a prime finite field where p is an odd prime number, and let a, b $\in \mathbb{F}_p$ satisfy $4a^3 + 27b^2 \not\equiv 0 \pmod{p}$. The elliptic curve group $E(\mathbb{F}_p)$ over $\mathbb{F}_p$, which is defined by the parameters a, b $\in \mathbb{F}_p$ includes the set of points P=(x, y) for x, y $\in \mathbb{F}_p$ that represent a solution to the equation $y^2 \equiv x^3 + ax + b \pmod{p}$, together with a point $\mathcal{O}$ that is the identity element of the elliptic curve group $E(\mathbb{F}_p)$. The identity element $\mathcal{O}$ is sometimes referred to as the point at infinity.

In some ECC schemes, public elliptic curve domain parameters over $\mathbb{F}_p$ can be identified by a sextuple T=(p, a, b, G, n, h). Here, the integer p specifies the finite field $\mathbb{F}_p$. Field elements a, b $\in \mathbb{F}_p$ specify an elliptic curve $E(\mathbb{F}_p)$ over $\mathbb{F}_p$ as discussed above. The elliptic curve point $G=(x_G, y_G)$ on $E(\mathbb{F}_p)$ represents a base point generator that is one of the public parameters of the ECC scheme. In other words, an adversary is assumed to know the public generator G when security of the EEC scheme is analyzed. The integer n specifies the order of the public generator G, having the property $nG=\mathcal{O}$. The cofactor h is equal to $\#E(\mathbb{F}_p)/n$, which is the number of points on the elliptic curve $E(\mathbb{F}_p)$ divided by the order of the public generator G. Elliptic curve domain parameters may alternatively be identified over other types of finite fields. For example, public elliptic curve domain parameters over the characteristic two field $\mathbb{F}_{2^m}$ can be identified by a sextuple T=(m, f (x), a, b, G, n, h) where m is an integer specifying the finite field $\mathbb{F}_{2^m}$ and f(x) is an irreducible binary polynomial of degree m specifying the representation of $\mathbb{F}_{2^m}$. In some implementations, the elliptic curve domain parameters can be generated, validated, and utilized by the nodes 102, 104 in the communication system 100. In some implementations, the public elliptic curve domain parameters can be publicly shared among the entities in the communication system 100.

In an ECC scheme, an elliptic curve key pair (d, Q) can be generated based on valid elliptic curve domain parameters, for example, T=(p, a, b, G, n, h) or T=(m, f (x), a, b, G, n, h). The key pair may be generated by selecting a random integer d in the interval [1, n−1], computing Q=dG, and outputting the key pair (d, Q). The random integer d may be selected or obtained by a random number generator. In some implementations, the elliptic curve key pairs can be generated, validated, and processed by the nodes 102, 104 in the communication system 100.

In some implementations, ECC schemes can be implemented using small cryptographic keys and fast cryptographic operations with strong security, which may be useful in a variety of contexts, such as, for example, embedded devices and other types of systems. A number of ECC digital signature algorithms have been standardized, for example, ECDSA (Elliptic Curve Digital Signature Algorithm;), ECNR (Elliptic Curve Nyberg Rueppel), ECPVS (Elliptic Curve Pintsov Vanstone Signatures), ECQV (Elliptic Curve Qu Vanstone) and EdDSA (Edwards-curve Digital Signature Algorithm). In some cases, an ECC standard or another protocol can be modified or constructed to resist attacks by quantum-enabled adversaries. For instance, an ECC standard or other protocol can be modified or constructed to use a secret generator. In some cases, a Schnorr-type digital signature algorithm, such as, for example, EdDSA or another Schnorr-type digital signature algorithm, may be modified or constructed to use a secret generator, and the resulting process can include one or more of the techniques shown and described with respect to FIGS. 2-10.

Figure 2:
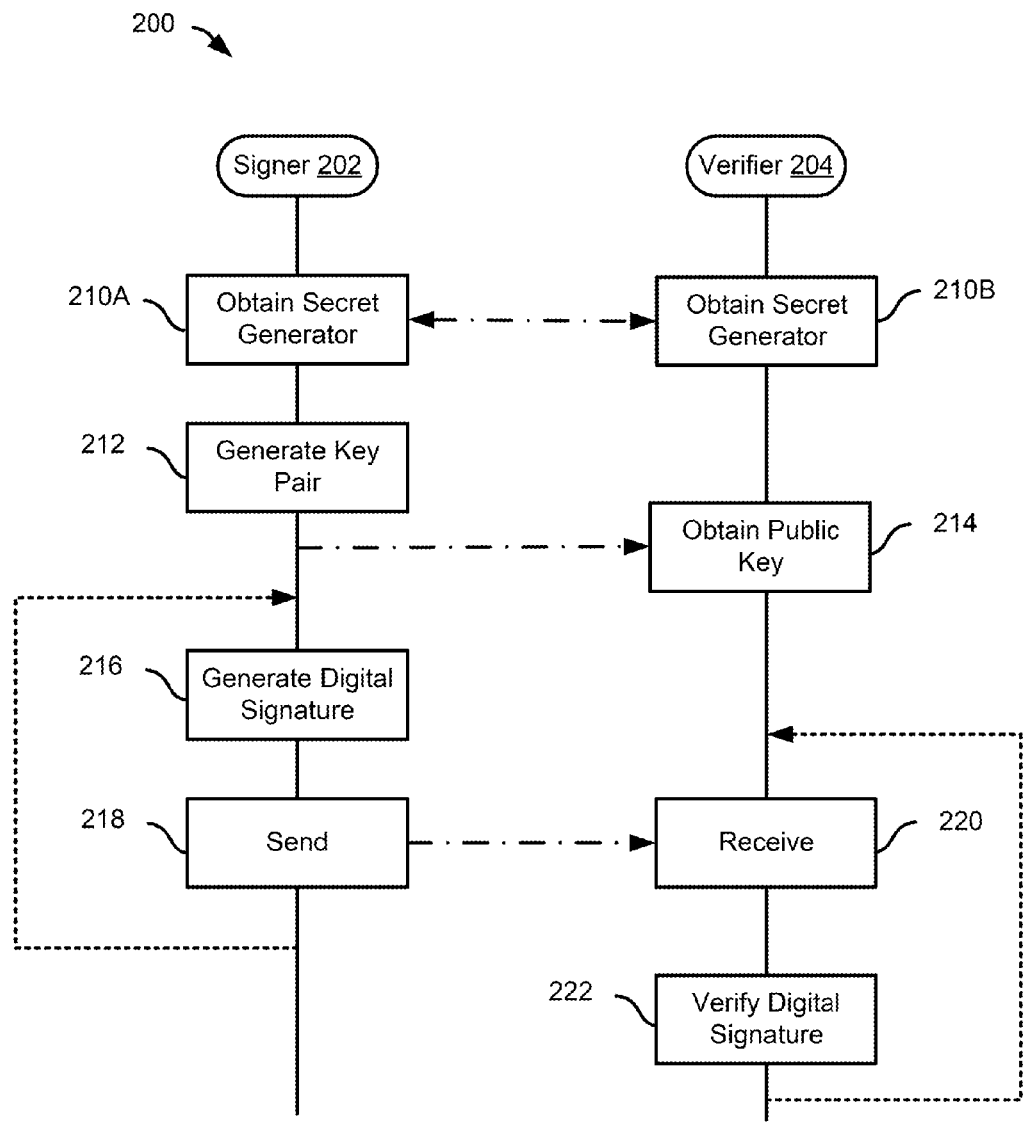
FIG. 2 is a flow diagram showing aspects of an example digital signature scheme.

FIG. 2 is a flow diagram showing aspects of an example digital signature process 200. The example digital signature process 200 can be performed, for example, by computer systems that can exchange information over a communication channel. For instance, operations in the digital signature process 200 may be performed by the nodes 102, 104 in the example communication system 100 shown in FIG. 1 or in another type of system. The example digital signature process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. For example, the processes shown in FIGS. 3-10 can be used, in some instances, to perform one or more of the example operations shown in FIG. 2. In some cases, operations can be combined, performed in parallel, iterated or otherwise repeated or performed another manner.

The example digital signature process 200 shown in FIG. 2 includes operations performed by a signer 202 and a verifier 204. In the example shown, the signer 202 and the verifier 204 represent two distinct entities in a cryptography system. In the example shown, the signer 202 generates a digital signature of a message, and sends the message and the digital signature to the verifier 204; the verifier 204 uses the digital signature to verify the authenticity of the message. In some cases, the signer 202 and verifier 204 may have a server-client relationship, a peer-to-peer relationship or another type of relationship.

In some examples, the digital signature process 200 is secure against quantum-enabled adversaries such as, for example, the quantum-enabled adversary 108 shown in FIG. 1. For instance, in some cases, the example digital signature process 200 is secure against certain types of attacks or other processes that can be performed by a quantum-enabled adversary who has access to public information exchanged between the signer 202 and the verifier 204. The example digital signature process 200 may also provide security against classically-enabled adversaries who do not have access to quantum computers or other quantum resources.

Figure 3:
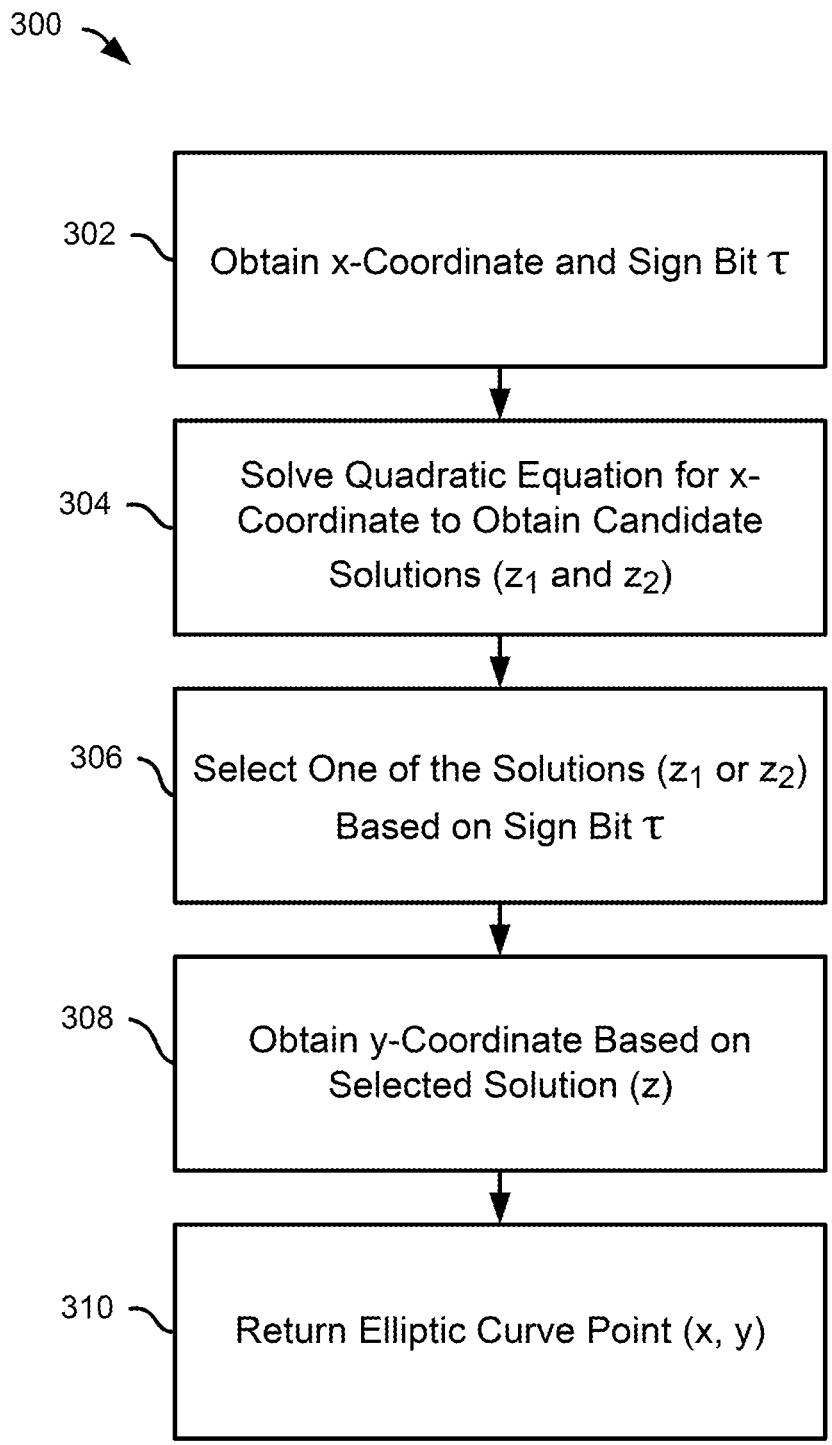
FIG. 3 is a flow diagram showing an example point decompression process.

At 210A, the signer 202 obtains a secret generator; at 210B, the verifier 204 obtains the same secret generator. In some cases, the signer 202 and verifier 204 use a point decompression process (e.g., as shown in FIG. 3) to generate the secret generator, which may ensure that both obtain the same secret generator value. In the example shown, the secret generator is a shared secret known to both the signer 202 and the verifier 204. The signer 202 and verifier 204 may obtain the secret generator in parallel, in series or otherwise. The signer 202 and the verifier 204 can use the same process or related processes to obtain the same secret generator.

In the example shown in FIG. 2, the secret generator may be generated by the signer 202 and the verifier 204, or the secret generator may be generated by another entity and provided to the signer 202 and the verifier 204. In some cases, the signer 202 and the verifier 204 each compute the secret generator, for example, based on other shared information. In some cases, the signer 202 and the verifier 204 each receive the secret generator from another entity, for example, from a trusted third party.

In the example shown in FIG. 2, the signer 202 and verifier 204 use a public generator G, which is a generator of a cyclic subgroup ⟨G⟩ of an elliptic curve. The signer 202 and verifier 204 also use a secret (or private) generator G', which is a generator of a cyclic subgroup ⟨G'⟩. In this example, the group ⟨G'⟩ may be a prime order cyclic subgroup that is equivalent to the group ⟨G⟩ (e.g., the cyclic subgroup may be shifted). The elliptic curve and the public generator G are public parameters that are shared by the signer 202 and the verifier 204. The signer 202 and verifier 204 may agree upon the elliptic curve, the public generator G and other parameters.

In some implementations, an elliptic curve E (defined over a finite field $\mathbb{F}_p$ or characteristic two field $\mathbb{F}_{2^m}$) and a public generator G define a cyclic subgroup ⟨G⟩ that has a large prime order n, and each element in the field that the elliptic curve E is defined on has a bit size of m. The secret generator G' can be selected (e.g., randomly, or by another type of process) from the group ⟨G⟩. In cases where ⟨G⟩ is a prime order cyclic subgroup, any elliptic curve point G' in the group ⟨G⟩ can construct a prime order cyclic subgroup ⟨G'⟩. The secret generator G' can be shared by a secure process between the signer 202 and the verifier 204, such that no adversary knows the secret generator G'.

Figure 4:
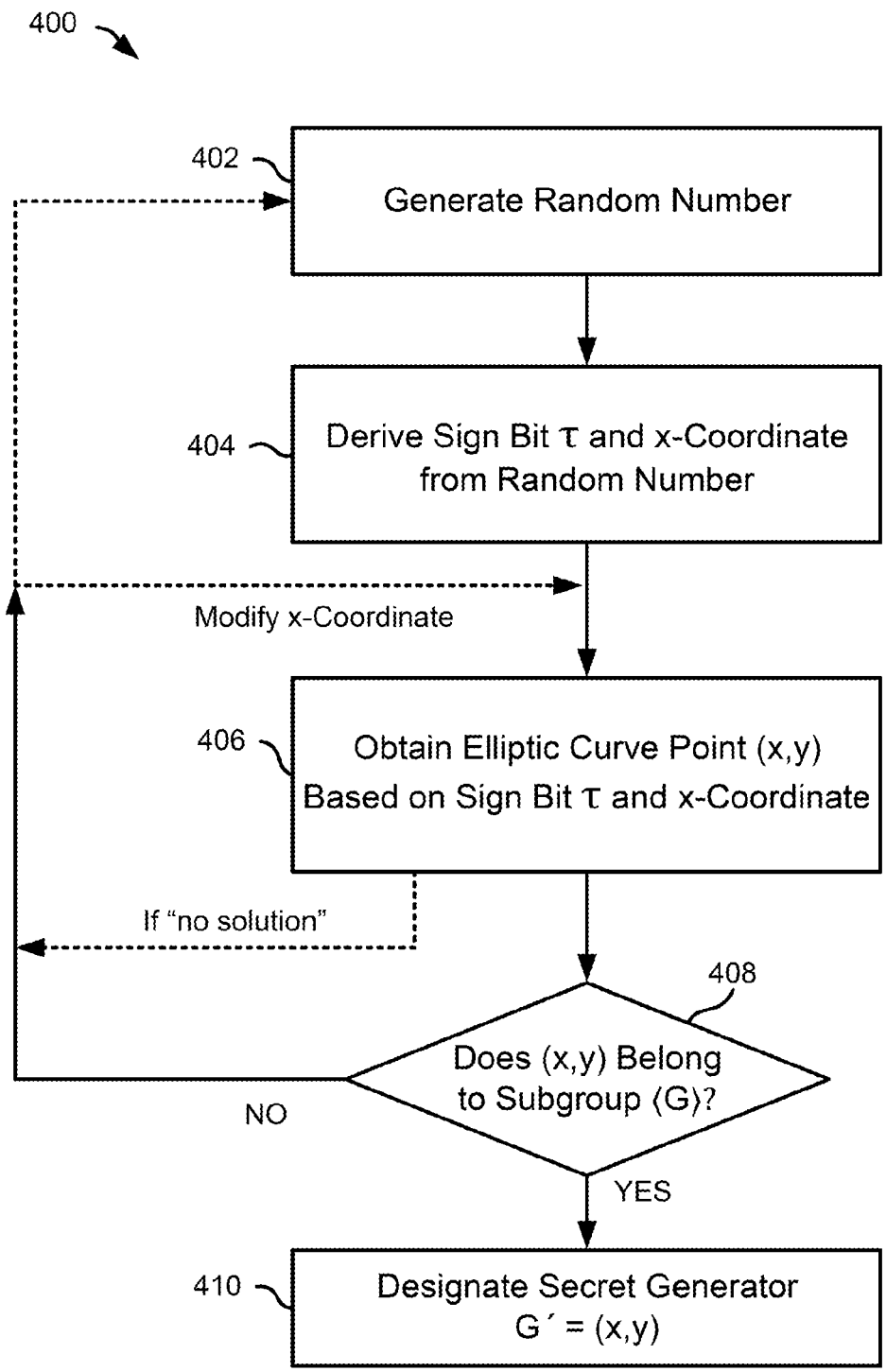
FIG. 4 is a flow diagram showing an example process for generating a secret generator.
Figure 8:
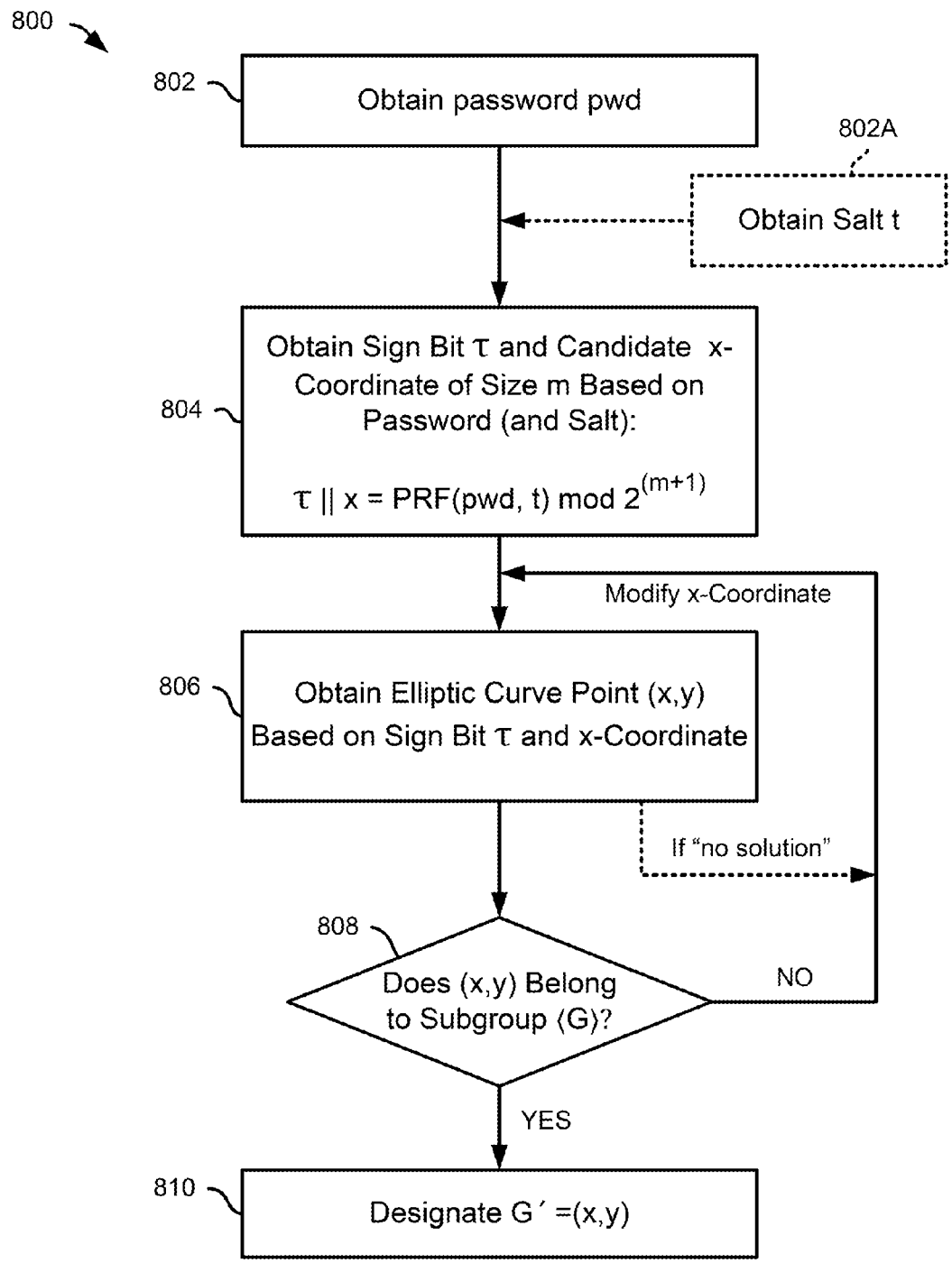
FIG. 8 is a flow diagram showing an example process for generating a secret generator based on a password.

In some implementations, the signer 202 and the verifier 204 obtain the secret generator using the example process 400 shown in FIG. 4, the example process 800 shown in FIG. 8 or another process. In some implementations, a secret password is used to obtain the secret generator G'.

In some implementations, the signer 202 and the verifier 204 obtain the secret generator based on a random integer. For example, a random integer $\alpha$ may be generated such that $\alpha \in_R \mathbb{Z}_n$, where $1 < \alpha < n-1$, and the secret generator G' can be computed by calculating G'=$\alpha$G. In this example, the random integer $\alpha$ is known to the entity that generates the secret generator G'. In some scenarios, the secret generator G' can be generated such that a random integer $\alpha$ is not known to any entity, which may reduce vulnerability to certain types of attacks.

At 212, the signer 202 generates a key pair. In the example shown, the secret generator G' is used to generate a key pair that includes a public key Q' and a private key d'. In this example, the key pair is an elliptic curve key pair, where the private key d' is an integer, the public key Q' is an elliptic curve point and Q'=d'G'. In some implementations, the example process 500 shown in FIG. 5 can be used to generate the key pair. In some examples, the key pair generated at 212 can be used as an ephemeral key pair, a long term key pair or another type of key pair. In some implementations, another type of key pair may be generated, or another type of process may be used to generate the key pair at 212.

At 214, the verifier 204 obtains the public key generated by the signer 202 at 212. In some cases, the signer 202 publishes the public key, and the verifier 204 may obtain the public key indirectly from another entity (e.g., a database, a server, etc.). In some cases, the signer 202 sends the public key to the verifier 204. For instance, the signer 202 may send the public key to the verifier with a digital signature at 218 or at another time.

At 216, the signer 202 generates a digital signature. In the example shown, the private key generated (at 212) by the signer 202 is used to generate the digital signature based on a message. In some examples, the signer's private key d' is used to generate a Schnorr-type digital signature. For instance, the signer's private key d' may be used to generate a digital signature (e, s) according to the example process 600 shown in FIG. 6. Other types of digital signature processes may be used to generate the digital signature in some instances.

The message that is used to generate the digital signature at 216 can be or include, for example, an electronic document, an electronic file, a data packet or data frame, a data object or information in another form or format. In some examples, the message is an e-mail message, an electronic document, or an electronic file that can be read, edited, rendered, manipulated or otherwise processed by a software application. For example, the message may be rendered on a user interface. In some examples, the message is a digest of another message, for example, a cryptographic hash of the other message or another type of digest. In some examples, the message is a data packet or a data object that can be read, edited, rendered, manipulated or otherwise processed by hardware. For example, the message may processed by a signaling system implemented in hardware or firmware. In some cases, the digital signature can be generated based on another type of message.

At 218, the signer 202 sends the message and the digital signature to the verifier 204. The digital signature can be combined with the message to form a signed message, which the signer 202 sends to the verifier 204, or the digital signature and the message may be sent separately. In some cases, the signer's public key (generated at 212) can be sent to the verifier 204 with the signed message, with the digital signature or with other information, or the signer's public key may be sent to the verifier 204 separately. In the example shown in FIG. 2, the signer 202 may send information directly to the verifier 204, or the signer 202 may initiate transmission indirectly, for example, through a server. All or part of the information can be transmitted over a public channel, and may be observed by a quantum-enabled adversary or another type of adversary.

At 220, the verifier 204 receives the information sent by the signer 202 at 218. For example, the verifier 204 may receive the message and the digital signature together as a signed message or as separate items. The verifier 204 may receive the signer's public key and other information along with the digital signature message, or the verifier 204 may receive the signer's public key and other information at another time or from another source.

At 222, the verifier 20 verifies the digital signature. In the example shown, the secret generator obtained by the verifier 204 (at 210B) and the signer's public key obtained by the verifier 204 (at 214) are used to verify the digital signature. In some examples, the signer's public key Q' and the secret generator G' are used to verify a Schnorr-type digital signature. For instance, the signer's public key Q' and the secret generator G' may be used to verify a digital signature (e, s) associated with a message M from the signer 202 according to the example process 700 shown in FIG. 7. In some cases, other types of digital signature verification processes may be used to verify the digital signature.

In some implementations of the example process 200, an adversary can compromise security if the adversary can find the signer's private key. For example, an attacker may forge a digital signature if the attacker has the signer's private key d'. In an example attack, the adversary attempts to learn the signer's private key d' by solving the equation Q'=d'G'. The example process 200 can be implemented in a manner that is secure against attacks by classical computing systems. In the example process 200, the secret generator G' is not known to the attacker. Moreover, a traditional classical computer (e.g., a computer that does not have quantum computational resources) cannot feasibly compute the signer's private key d' even if the secret generator G' and the signer's public key Q' are both known to an attacker. For instance, there is not a known algorithm by which a traditional classical computer can feasibly solve the elliptic curve discrete log problem, such as, for example, computing the integer p by solving P=pG from known values of elliptic curve points P and G.

In some cases, the example process 200 can be implemented in a manner that is secure against attacks by quantum computing systems. A quantum computing system (e.g., the quantum-enabled adversary 108 shown in FIG. 1) may be able to solve the elliptic curve discrete log problem, for example, to compute the integer p by solving P=pG from known values of elliptic curve points P and G using Shor's algorithm. However, in the example process 200 shown in FIG. 2, the secret generator G' is not known to attackers. In an example attack by a quantum computing system, the adversary can compute an integer λ based on the public generator G and the signer's public key Q', such that Q'=λG. To find the private key d', the adversary may then search (e.g., by a brute force search) for an unknown value α such that λ=d'α. But there is not a known algorithm by which the value α can be feasibly computed by the attacker. For instance, even if the quantum computing system were able to implement Grover's algorithm, it can only reduce the search space down to the square root of the size of the private key space $\mathbb{Z}_{n}$, which is the same security level provided, for example, by current ECC standards against attacks by traditional computers.

In some implementations of the example process 200, when a password-based method is used to generate the secret generator, the process 200 can be secure against a classical adversary that applies a brute-force attack on the passwords. For example, such known attacks cannot efficiently find the secret generator G' from the password, and additional security may be provided, for example, when a random salt is used. For example, the random salt may provide additional security against off-line dictionary attacks and other types of attacks.

In some implementations of the example process 200, when a password-based method is used, the process 200 can be secure against a quantum adversary. As discussed above, an attack on the private key d' using Shor's algorithm would be infeasible. If a quantum attacker attempts to find the secret generator G' from the password using Grover's algorithm, the quantum attacker must run Shor's algorithm inside of each search in Grover's algorithm (to confirm the correctness of the search). Such a quantum attack cannot be executed efficiently with current known technology, and the technique is secure against such quantum attacks.

In some implementations of the example process 200, when computing the secret generator from a password, adding a random salt improves the security. For example, the signer 202 may generate a random salt and use it along with the password to produce the secret generator. The salt can be communicated to the verifier 204, such that the verifier 204 can compute the same secret generator. The salt can be a public value or a private value, in some cases.

In some implementations of the example process 200, signing and verification mechanisms of a Schnorr-type ECC digital signature algorithm (e.g., EdDSA) are deployed. For instance, such algorithms can be converted to become quantum resistant by the use of a secret generator. In some cases, a Schnorr-type ECC digital signature algorithm can use the same mathematics as El Gamal-type ECC digital signatures (e.g., ECDSA, ECNR, ECPVS, or ECQV). Thus, when elliptic curve and finite field arithmetic interfaces are available, the mathematical operations for Schnorr-type digital signatures are available.

In some implementations of the example process 200, a digital signature is generated and verified in the context of a secure communication protocol, such as, for example, transport layer security (TLS), or another secure communication protocol. In some secure communication protocols, authentication by digital signature is followed by establishment of symmetric key for encryption of the subsequent traffic using a key agreement algorithm. For example, authentication may be followed by an ECC key agreement algorithm such as Elliptic Curve Diffie Hellman (ECDH). In such a case, the same secret generator G' used for the ECC digital signature can be used for the key agreement, which may make the key agreement also quantum resistant.

FIG. 3 is a flow diagram showing an example point decompression process 300. The example point decompression process 300 can be performed, for example, by a computer system that includes a memory and a processor. For instance, operations in the point decompression process 300 may be performed by either of the nodes 102, 104 in the example communication system 100 shown in FIG. 1 or in another type of system. In some cases, the example point decompression process 300 can be performed or utilized as part of a signing process (e.g., by an entity generating a digital signature), as part of a verification process (e.g., by an entity verifying a digital signature), or in another type of process.

The example point decompression process 300 may include additional or different operations, and the operations may be performed in the order shown or in another order. In some cases, one or more of the operations shown in FIG. 3 are implemented as processes that include multiple operations, sub-processes for other types of routines. In some cases, operations can be combined, performed in another order, performed in parallel, iterated or otherwise repeated or performed another manner.

In some cases, the operations shown in FIG. 3 can be implemented as a point decompression function. For example, the point decompression function may be configured to compute an elliptic curve point (x, y). In some implementations, the point decompression function receives inputs that include a sign bit τ and an x-coordinate x, and the point decompression function produces outputs that include the elliptic curve point (x, y) or possibly "no solution" in some instances. A point decompression function may receive other inputs, produce other outputs or include other operations.

In some implementations, the point decompression process 300 is used to randomly compute a secret generator G', for example, in the process 400 shown in FIG. 4. In some implementations, the point decompression process 300 is used to compute a secret generator G' based on a password, for example, in the process 800 shown in FIG. 8. The point decompression process 300 may be used in other types of processes, for other purposes, in other contexts.

In the example shown in FIG. 3, an elliptic curve equation can be defined over $\mathbb{F}_p$, for example, as $$y^2 = x^3 + ax + b \quad (1)$$

Or an elliptic curve equation can be defined over $\mathbb{F}_{2^{\wedge}m}$, for example, as $$y^2 + yx = x^3 + ax + b. \quad (2)$$

These or other elliptic curve equations and parameters may be specified, for example, by the public parameters of an elliptic curve cryptosystem, by agreement between entities or otherwise.

At 302, an x-coordinate x and a sign bit τ are obtained. For example, the x-coordinate x and a sign bit τ may be accessed as inputs, accessed in memory, accessed from another system or otherwise obtained. At 304, the quadratic equation (e.g., either Equation 1 or Equation 2 above) is solved based on the x-coordinate to obtain two candidate solutions $z_1$ and $z_2$. The candidate solutions $z_1$ and $z_2$ are values (e.g., binary values) for y that satisfy the relevant elliptic curve equation (e.g., either Equation 1 or Equation 2 above). In some cases, in the event that there is no quadratic solution available, the point decompression function can return "no solution" or another indicator. In some cases, in the event that there is no quadratic solution available, the point decompression function may return to a prior operation or modify parameters and try again. For example, the process 300 may return to 302 and obtain a new x-coordinate, or the process 300 may return to 304 after modifying the x-coordinate obtained at 302.

At 306, one of the candidate solutions $z_1$ and $z_2$ is selected based on the sign bit τ. In some implementations, the sign bit τ is compared with part of each candidate solution, and the candidate solution that matches is chosen. For example, the sign bit τ may be compared with the least significant bit (LSB) or another bit value of both candidate solutions $z_1$ and $z_2$, and the candidate solution that has the matching LSB can be chosen. In some implementations, another process is used to select one of the candidate solutions.

At 308, the y-coordinate is computed based on the selected candidate solution. For example, using the selected solution z from 306 (where z is either $z_1$ or $z_2$), the y-coordinate y can be computed based on the relevant elliptic curve equation. For example, the y-coordinate can be computed as y=z for the elliptic curve equation defined over $\mathbb{F}_p$ (e.g., as in Equation 1), or the y-coordinate can be computed as y=zx for the elliptic curve equation defined over $\mathbb{F}_{2^{\wedge}m}$ (e.g., as in Equation 2). The y-coordinate may be computed in another manner in some cases.

At 310, the elliptic curve point is returned, for example, as an output of a point decompression function. The elliptic curve point (x, y) returned at 310 includes an x-coordinate (corresponding to the x-coordinate obtained at 302) and a y-coordinate (corresponding to the y-coordinate obtained at 308).

FIG. 4 is a flow diagram showing an example process 400 for generating a secret generator. The example process 400 can be performed, for example, by a computer system that includes a memory and a processor. For instance, operations in the process 400 may be performed by either of the nodes 102, 104 in the example communication system 100 shown in FIG. 1 or in another type of system. In some cases, the example process 400 can be performed or utilized as part of a signing process (e.g., by an entity generating a digital signature), as part of a verification process (e.g., by an entity verifying a digital signature), or in another type of process.

The example process 400 may include additional or different operations. In some cases, one or more of the operations shown in FIG. 4 are implemented as processes that include multiple operations, sub-processes for other types of routines. In some cases, operations can be combined, performed in another order, performed in parallel, iterated or otherwise repeated or performed another manner.

At 402, a random number is generated. For example, a pseudo-random number generator may be used to generate a random number. In some cases, the random number is an m+1 bit value (a binary value composed of m+1 bits), where m represents the bit-length of an element in a finite field over which an elliptic curve is defined.

At 404, an x-coordinate x and a sign bit τ are derived from the random number generated at 402. In some cases, the random number is designated as a concatenation of the x-coordinate x and the sign bit τ, such that the x-coordinate x and sign bit τ can be extracted directly from the bit values of the random number. For instance, the random number generated at 402 can be considered to have the form τ||x, where the sign bit τ is concatenated with the x-coordinate x.

At 406, an elliptic curve point (x, y) is obtained based on the x-coordinate x and the sign bit τ. For example, the elliptic curve point (x, y) can be generated according to the point decompression process 300 shown in FIG. 3, or the elliptic curve point (x, y) can be generated according to another type of process. As shown in FIG. 4, if "no solution" is obtained (e.g., as an output of a point decompression function) at 406, the process 400 may return to a prior operation or modify parameters and try again. For example, the process 400 may return to 402 and generate a new random number, or the process 400 may return to 406 after modifying the x-coordinate obtained at 404.

At 408, it is determined whether the elliptic curve point (x, y) belongs to an elliptic curve subgroup ⟨ G ⟩. Here, the elliptic curve subgroup ⟨ G ⟩ is the cyclic subgroup defined by the public generator G. If the elliptic curve point (x, y) does not belong to the elliptic curve subgroup ⟨ G ⟩, the process 400 may return to a prior operation or modify parameters and try again, for example, as described above with respect to 406. If the elliptic curve point (x, y) does belong to the elliptic curve subgroup ⟨ G ⟩, the process 400 may proceed to 410.

At 410, the elliptic curve point (x, y) is designated as the secret generator G'. The secret generator G' may then be used, for example, as shown in FIG. 2, or the secret generator G' may be used in another manner. In some cases, the process 400 is performed by client systems or peer systems in a network. In some cases, the process 400 is performed by a server system. For example, the server system can pre-compute the secret generator G' according to the process 400, and then provision the secret generator G' to client devices. The secret generator G' can be provisioned to other systems, for example, by a process for provisioning a shared secret. For instance, the secret generator G' can be embedded or injected on a client device by a secure process upon provisional time, the secret generator G' can be delivered through a network using password-based encryption scheme, or the secret generator G' can be distributed to other systems in another manner.

Figure 5:
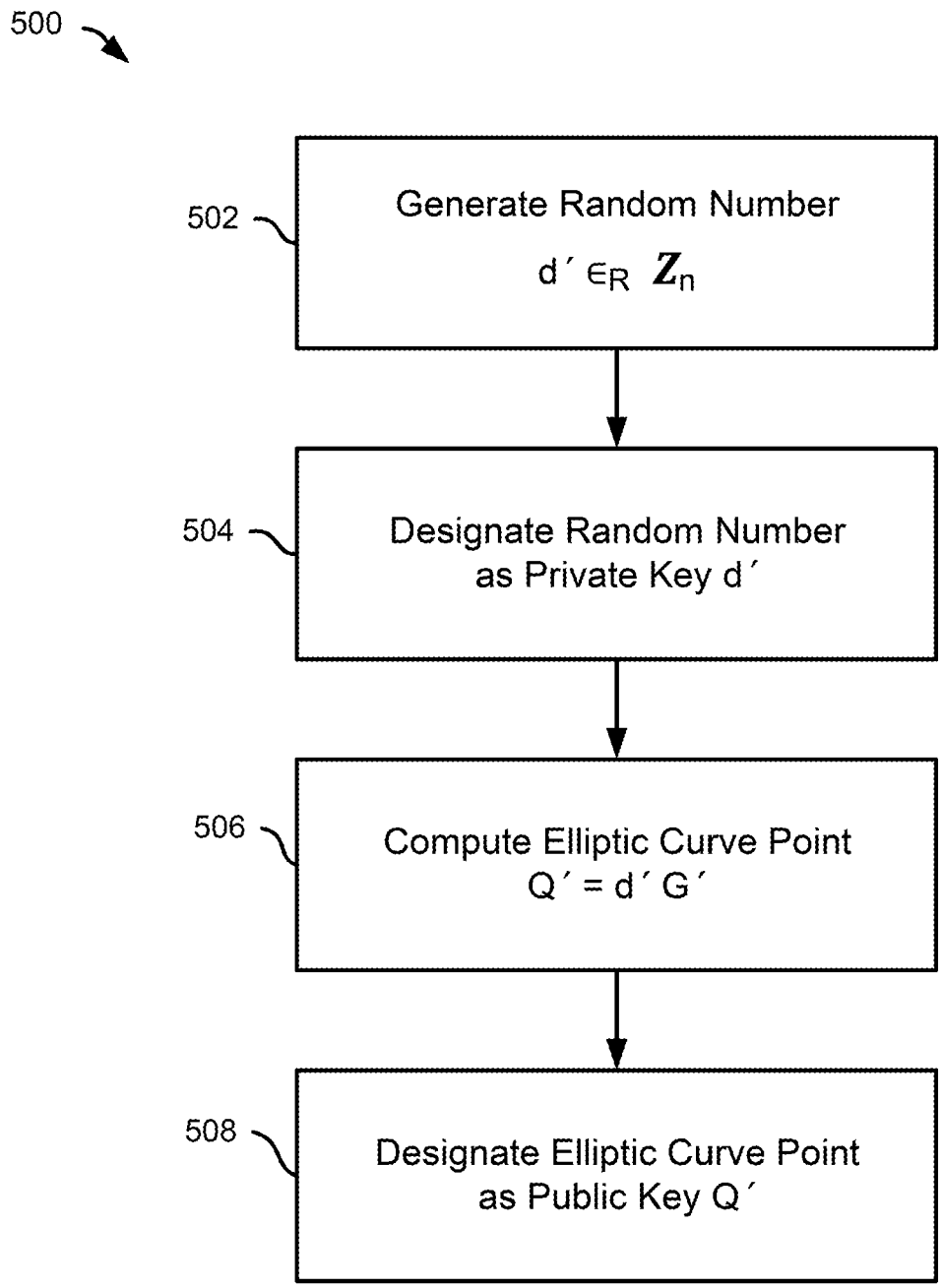
FIG. 5 is a flow diagram showing an example process for generating an ECC key pair using a secret generator.

FIG. 5 is a flow diagram showing an example process 500 for generating an ECC key pair using a secret generator. The example process 500 can be performed, for example, by a computer system that includes a memory and a processor.

For instance, operations in the process 500 may be performed by either of the nodes 102, 104 in the example communication system 100 shown in FIG. 1 or in another type of system. In some cases, the example process 500 can be performed or utilized as part of a signing process (e.g., by an entity generating a digital signature), as part of a verification process (e.g., by an entity verifying a digital signature), or in another type of process.

The example process 500 may include additional or different operations. In some cases, one or more of the operations shown in FIG. 5 are implemented as processes that include multiple operations, sub-processes for other types of routines. In some cases, operations can be combined, performed in another order, performed in parallel, iterated or otherwise repeated or performed another manner.

At 502, a random number d' is generated, where $d' \epsilon_R \mathbb{Z}_n$. For example, a pseudo-random number generator may be used to generate a random number. At 504, the random number generated at 502 is designated as a private key d'. In some implementations, a validation procedure is used to determine that an integer generated at 502 is a valid private key for a cryptography system. At 506, an elliptic curve point Q' is computed based on the private key d' and a secret generator G'. As shown in FIG. 5, the elliptic curve point Q' is computed by multiplying the private key d' and the secret generator G', Q'=d'G'. At 508, the elliptic curve point computed at 506 is designated as a public key Q'. In some implementations, a validation procedure is used to determine that the elliptic curve point computed at 506 is a valid public key for a cryptography system.

Figure 6:
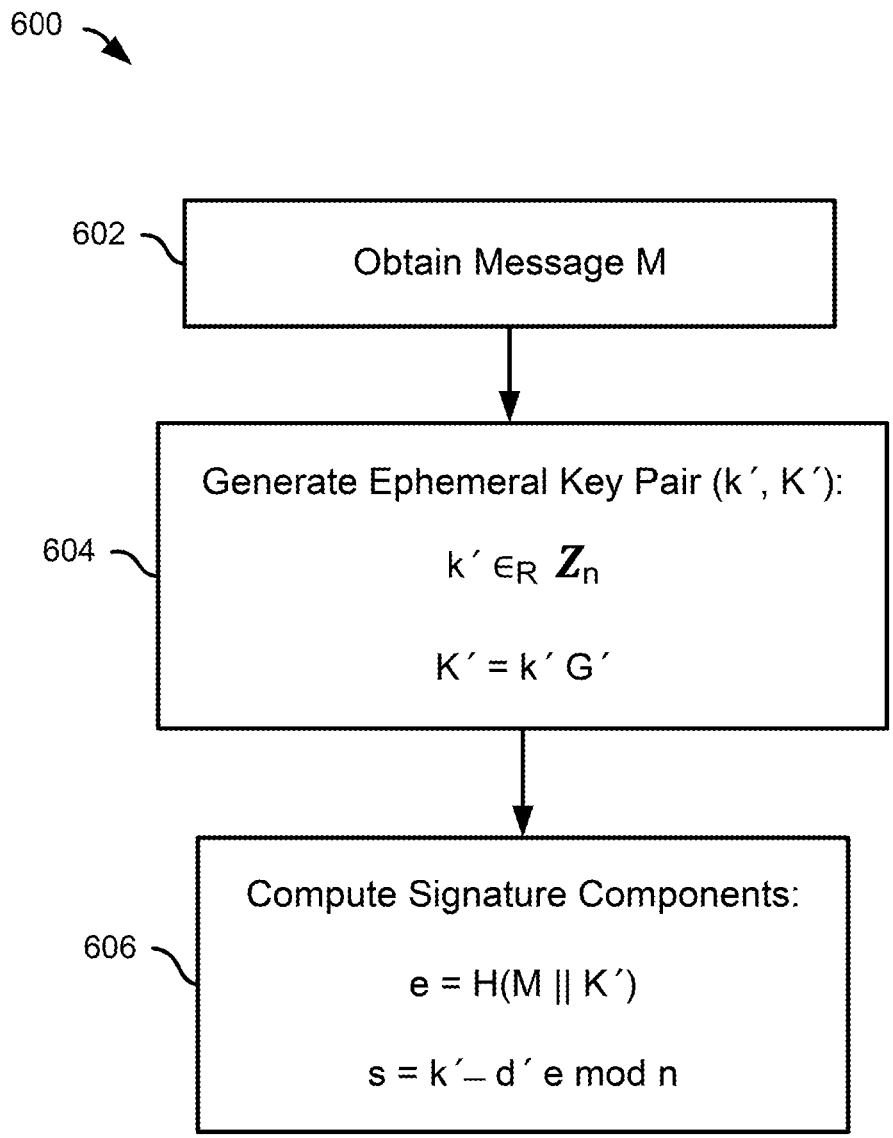
FIG. 6 is a flow diagram showing an example process for generating a digital signature.

FIG. 6 is a flow diagram showing an example process 600 for generating a digital signature. The example process 600 can be performed, for example, by a computer system that includes memory and a processor. For instance, operations in the process 600 may be performed by either of the nodes 102, 104 in the example communication system 100 shown in FIG. 1 or in another type of system. The example process 600 may include additional or different operations. In some cases, one or more of the operations shown in FIG. 6 are implemented as processes that include multiple operations, sub-processes for other types of routines. In some cases, operations can be combined, performed in another order, performed in parallel, iterated or otherwise repeated or performed another manner.

In some cases, the operations shown in FIG. 6 can be implemented as a signing function. For example, the signing function may be configured to generate a digital signature. In some implementations, the signing function receives inputs that include a message M, and the signing function produces outputs that include digital signature components (e, s). A signing function may receive other inputs, produce other outputs or include other operations.

At 602, a message M is obtained. For example, the message M may be accessed as an input, accessed in memory, accessed from another system or otherwise obtained. At 604, an ephemeral key pair is generated. In some implementations, a secret generator G' is used to generate the key pair. In some cases, the secret generator G' is obtained as described with respect to operation 210A in FIG. 2, for instance, using the example process 400 shown in FIG. 4, the example process 800 shown in FIG. 8 or another process. In the example shown in FIG. 6, the secret generator G' is used to generate an ephemeral key pair (k', K'), which includes an ephemeral private key k' and an ephemeral public key K'. As shown, a random integer is obtained and designated as the ephemeral private key k', where $k' \epsilon_R \mathbb{Z}_n$; and the ephemeral public key K' is computed by multiplying the ephemeral private key k' and the secret generator G', such that K'=k'G'. The random integer may be obtained, for example, from a pseudo-random number generator.

At 606, signature components are computed. In some implementations, the ephemeral keys k' and K' (generated at 604) and a long-term private key d' are used to generate the signature components (e, s). In some cases, the long term private key d' is obtained as described with respect to operation 212 in FIG. 2, for instance, using the example process 500 shown in FIG. 5 or another process. As shown in FIG. 6, a first signature component e is generated using a hash function H. In particular, the first signature component e is the output of a hash function applied to a hash function input. In some cases, the hash function H can be specified by parameters of the cryptography system, selected by the signer or otherwise designated. In some implementations, one or more conventional hash functions in the SHA-2 family (e.g., SHA-256, SHA-512) or SHA-3 family can be used. Additional or different hash functions may be used. In the example shown, the hash function input is based on the message M and the ephemeral public key K'. In particular, the first signature component is computed by applying the hash function H to the input M∥K', which is the message M concatenated with the ephemeral public key K', such that e=H(M∥K'). As shown in FIG. 6, a second signature components is generated based on the ephemeral private key k', the long term private key d' and the first signature component e, such that s=k'−d'e mod n. Here, the integer n represents the order of the public generator G.

In the example shown in FIG. 6, the ephemeral private key k' and long term private key d' are secret values known only to the signer (the entity signing the message M), and the secret generator G' is a shared secret known only to the signer, the entity who will verify the digital signature, and possibly one or more other trusted entities. In some cases, the digital signature (e, s) generated at 606 is sent to another entity, for instance, to a verifier as described with respect to operation 218 in FIG. 2.

Figure 7:
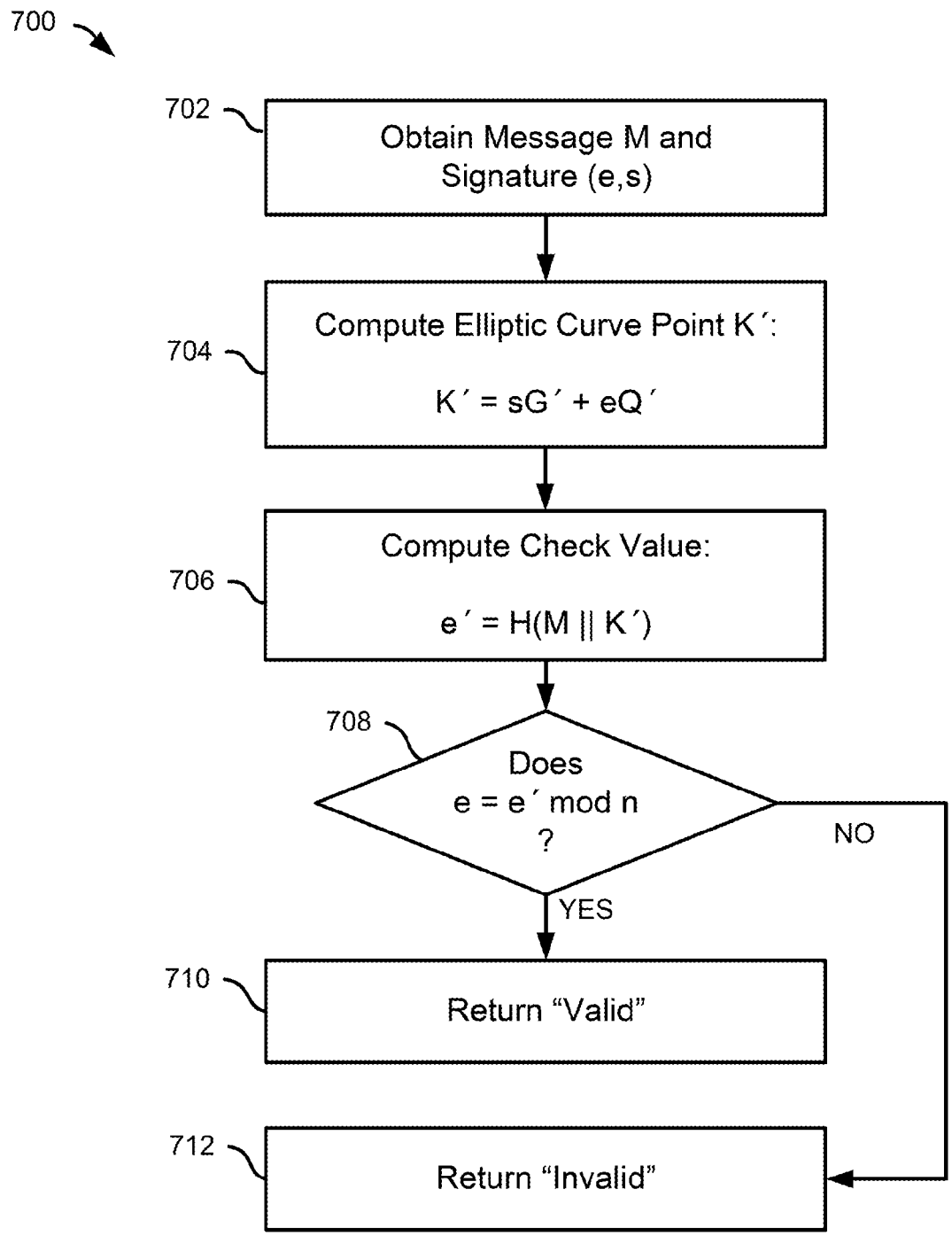
FIG. 7 is a flow diagram showing an example process for verifying a digital signature.

FIG. 7 is a flow diagram showing an example process 700 for verifying a digital signature. For instance, the process 700 may be used to verify a digital signature generated according to the example process 600 shown in FIG. 6. The example process 700 can be performed, for example, by a computer system that includes a memory and a processor. For instance, operations in the process 700 may be performed by either of the nodes 102, 104 in the example communication system 100 shown in FIG. 1 or in another type of system. The example process 700 may include additional or different operations. In some cases, one or more of the operations shown in FIG. 7 are implemented as processes that include multiple operations, sub-processes for other types of routines. In some cases, operations can be combined, performed in another order, performed in parallel, iterated or otherwise repeated or performed another manner.

In some cases, the operations shown in FIG. 7 can be implemented as a verification function. For example, the verification function may be configured to verify a digital signature. In some implementations, the verification function receives inputs that include a message M and a digital signature (e, s), and the verification function produces outputs that indicate whether the digital signature is valid. A verification function may receive other inputs, produce other outputs or include other operations.

The example process 700 can be used to verify the digital signature (e, s) generated by the process 600 shown in FIG. 6. In the example shown, the digital signature (e, s) to be verified is associated with a message M from the signing entity (the entity who purportedly generated the digital signature). For example, a verifier may receive the digital signature (e, s) and the associated message M, for instance, as described with respect to operation 220 in FIG. 2. The verifier also obtains one or more public keys of the signer. For example, the verifier may obtain a long-term public key and possibly other information associated with the signer.

At 702, the message M and the digital signature (e, s) are obtained. For example, the message M and the digital signature (e, s) may be accessed as inputs, accessed in memory, accessed from another system or otherwise obtained. In some instances, the message M obtained at 702 in FIG. 7 is the same message M obtained at 602 in FIG. 6; and the digital signature (e, s) obtained at 702 in FIG. 7 is the same digital signature (e, s) generated at 606 in FIG. 6.

At 704, an elliptic curve point is computed. In some implementations, a secret generator G' is used to compute the elliptic curve point K'. In some instances, the secret generator G' used at 704 in FIG. 7 is the same secret generator G' used by the signer (e.g., at 604 in FIG. 6) to generate the digital signature. For example, the secret generator G' can be obtained as described with respect to operation 210B in FIG. 2, for instance, using the example process 400 shown in FIG. 4, the example process 800 shown in FIG. 8 or another process. In the particular example shown in FIG. 7, the elliptic curve point K' is computed based on the secret generator G', the long term public key Q' of the signer and the digital signature (e, s), such that K'=sG'+eQ'.

At 706, a check value e' is computed based on the message and the elliptic curve point. In the example shown, a hash function H is used to compute the check value e' based on the message M and the elliptic curve point K'. The check value e' may be computed at 706 in FIG. 7 using the same hash function H that was used by the signer (e.g., at 606 in FIG. 6) to compute the first signature component e. As shown in FIG. 7, the check value e' is the output of a hash function applied to the message M concatenated with the elliptic curve point K', such that e'=H(M||K').

At 708, it is determined whether the first signature component e is equal to the check value e', modulo the integer n. Here, the integer n represents the order of the public generator G. If the compared quantities are equal, the digital signature is considered valid, and an indication (e.g., "valid") is returned at 710. If the compared quantities are not equal, the digital signature is considered invalid, and an indication (e.g., "invalid") is returned at 712.

The example digital signature (e, s) that is generated in the process 600 and verified in the process 700 is an example of a Schnorr-type digital signature. Other types of digital signatures may be generated based on a secret generator. In some cases, signature components can be computed based on other elements, using other computations or by other types of process that are different from the example process 600 shown in FIG. 6; and the resulting digital signature can be verified based on other elements, using other computations or by other types of process that are different from the example process 700 shown in FIG. 7. For instance, the example process 600 can be modified to compute the signature components according to different equations, and the example process 700 can be modified in a corresponding manner to verify the signature components according to different equations.

FIG. 8 is a flow diagram showing an example process 800 for generating a secret generator based on a password. The example process 800 can be performed, for example, by a computer system that includes a memory and a processor. For instance, operations in the process 800 may be performed by either of the nodes 102, 104 in the example communication system 100 shown in FIG. 1 or in another type of system. In some cases, the example process 800 can be performed or utilized as part of a signing process (e.g., by an entity generating a digital signature), as part of a verification process (e.g., by an entity verifying a digital signature), or in another type of process.

The example process 800 may include additional or different operations. In some cases, one or more of the operations shown in FIG. 8 are implemented as processes that include multiple operations, sub-processes for other types of routines. In some cases, operations can be combined, performed in another order, performed in parallel, iterated or otherwise repeated or performed another manner.

At 802, a password is obtained. At 802A, a salt value is obtained. For example, the password pwd and the salt t may be accessed as inputs, accessed in memory, accessed from another system or otherwise obtained. The use of a salt value in the process 800 is optional, so the operation 802A may be omitted in some cases. For example, using a salt can improve security, for instance, making it possible for the secret generator G' to expand to the full elliptic curve, which may reduce vulnerability to certain attacks (e.g., brute force attacks, including off-line attacks such as a dictionary attack, etc.). Using a salt may also allow multiple candidate values for the secret generator to be computed, for example, until a valid candidate is found.

In the example shown, the password pwd is a shared secret between two entities, for example, between a signer and verifier who need to use the same secret generator to generate and verify a digital signature, respectively. The password can be a one-time password that is used only once to compute a secret generator G'. The password may be established between the entities according to a password establishment process. For example, the password may be provided or shared in a separate communication channel, such as, for example, a secure messaging channel, a separate e-mail, etc. As another example, the password may be established using a synchronized identification token. An example of a synchronized identification token generator is Google Authenticator, which has been used for one-time password establishment in other contexts. When a synchronized identification token is used, the password space may be small, and in such cases the use of a salt value may provide additional security. In some implementations, the salt value is obtained by generating a random number and designating the random number as the salt t. For example, a pseudo-random number generator may be used to generate a random number.

At 804, an x-coordinate x and a sign bit τ are obtained based on the password obtained at 802 and the salt value obtained at 802A. In some cases, the x-coordinate x and the sign bit τ are obtained based on the password obtained at 802, not based on a salt value. In some cases, the output from a pseudo random function (e.g., a hash function) is designated as a concatenation of the x-coordinate x and the sign bit τ, such that the x-coordinate x and sign bit τ can be extracted directly from the bit values of the random number. For instance, the output value provided by the pseudo random function PRF can be considered to have the form τ||x or x||τ, where the sign bit τ is concatenated with the x-coordinate x. In the example shown in FIG. 8, if the salt value is used, the x-coordinate x and the sign bit τ are obtained based on the pseudo random function operating on the password and the salt value, such that $\tau\|x=\text{PRF}(\text{pwd}, t) \bmod 2^{(m+1)}$. In the example shown in FIG. 8, if the salt value is not used, the x-coordinate x and the sign bit τ are obtained based on the pseudo random function operating on the password, such that $\tau\|x=\text{PRF}(\text{pwd}) \bmod 2^{(m+1)}$. The x-coordinate x and a sign bit τ may be obtained based on a password in another manner.

At 806, an elliptic curve point (x, y) is obtained based on the x-coordinate x and the sign bit τ. For example, the elliptic curve point (x, y) can be generated according to the point decompression process 300 shown in FIG. 3, or the elliptic curve point (x, y) can be generated according to another type of process. As shown in FIG. 8, if "no solution" is obtained (e.g., as an output of a point decompression function) at 806, the process 800 may return to a prior operation or modify parameters and try again. For example, the process 800 may return to 806 after modifying the x-coordinate obtained at 804. As another example, the process 800 may return to 802A to regenerate the salt, for example, when the process 800 is performed by a signer.

In some cases, the operations performed in response to "no solution" returned at 806 can be coordinated or agreed upon in advance between the signer and the verifier. For example, if the signer is to regenerate the salt in response to detecting "no solution," the verifier may return "failure" in response to detecting "no solution," since the verifier cannot regenerate the salt. As another example, if the x-coordinate is to be modified in response to detecting "no solution," the operations used to modify the x-coordinate, such as, for example, "add 1" can be agreed upon in advance between the signer and verifier.

At 808, it is determined whether the elliptic curve point (x, y) belongs to an elliptic curve subgroup ⟨ G⟩. Here, the elliptic curve subgroup ⟨ G⟩ is the cyclic subgroup defined by the public generator G. If the elliptic curve point (x, y) does not belong to the elliptic curve subgroup ⟨ G⟩, the process 800 may return to a prior operation or modify parameters and try again, for example, as described above with respect to 806. If the elliptic curve point (x, y) does belong to the elliptic curve subgroup ⟨ G⟩, the process 800 may proceed to 810.

At 810, the elliptic curve point (x, y) is designated as the secret generator G'. The secret generator G' may then be used, for example, as shown in FIG. 2, or the secret generator G' may be used in another manner. In some cases, the process 800 is performed by client systems or peer systems in a network. In some cases, the process 800 is performed by a server system.

In some cases, the signer can produce many digital signatures using the same private key d'; the verifier may keep the corresponding public key Q' or the signer may resend the corresponding public key Q' with each digital signature. In some cases, if the participants agree to use a one-time password each time a digital signature is generated, the public key Q' can be sent with the digital signature each time, as a one-time-signature. In such cases, the value of the public key Q' changes each time a signature is generated because a different password is used each time, and thus the secret generator G' is different each time.

Figure 9:
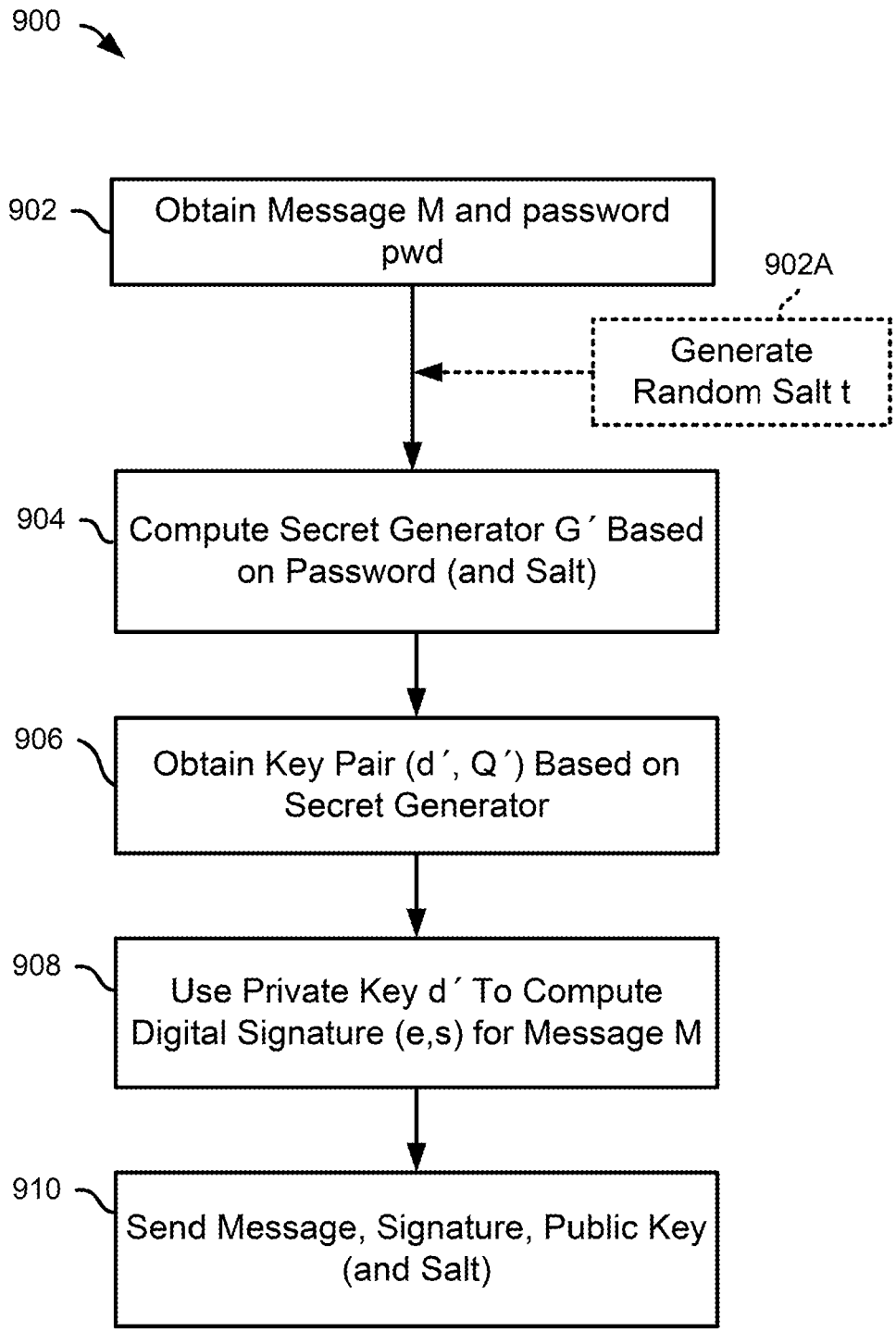
FIG. 9 is a flow diagram showing an example process for generating a digital signature based on a password.

FIG. 9 is a flow diagram showing an example process 900 for generating a digital signature based on a password. The example process 900 can be performed, for example, by a computer system that includes a memory and a processor. For instance, operations in the process 900 may be performed by either of the nodes 102, 104 in the example communication system 100 shown in FIG. 1 or in another type of system. The example process 900 may include additional or different operations. In some cases, one or more of the operations shown in FIG. 9 are implemented as processes that include multiple operations, sub-processes for other types of routines. In some cases, operations can be combined, performed in another order, performed in parallel, iterated or otherwise repeated or performed another manner.

In some cases, the operations shown in FIG. 9 can be implemented as a signing function. For example, the signing function may be configured to generate a digital signature. In some implementations, the signing function receives inputs that include a message M, a password pwd and a salt t, and the signing function produces outputs that include digital signature components (e, s). A signing function may receive other inputs, produce other outputs or include other operations.

At 902, a message and password are obtained. At 902A, a salt value is obtained. For example, the message M, the password pwd and the salt t may be accessed as inputs, accessed in memory, accessed from another system or otherwise obtained. The use of a salt value in the process 900 is optional, so the operation 902A may be omitted in some cases.

In the example shown, the password pwd is a shared secret between two entities, for example, between a signer and verifier who need to use the same secret generator to generate and verify a digital signature, respectively. The password pwd and the salt t may be obtained, for example, as described with respect to operations 802 and 802A in FIG. 8.

At 904, a secret generator G' is computed based on the password and the salt. In some cases, the secret generator G' is computed based on the password obtained at 902 and the salt value generated at 902A. In some cases, the secret generator G' is computed based on the password obtained at 902, and not based on a salt value. The secret generator G' may be generated at 904 according to the example process 800 shown in FIG. 8, or according to another process.

At 906, a key pair is obtained based on the secret generator G' that was obtained at 904. For example, the key pair (d', Q') may be generated according to the example process 500 shown in FIG. 5, or according to another process. At 908, the private key obtained at 906 is used to compute a digital signature (e, s) based on the message M. For example, the private key d' may be used to compute the digital signature according to the example process 600 shown in FIG. 6, or according to another process.

At 910, the message M, the digital signature (e, s) and the public key Q' are sent. If a salt value is used to compute the secret generator G' at 904, the salt t may also be sent at 910. The information may be sent directly or indirectly to a message recipient, who may use the public key Q' to verify the digital signature (e, s). The message M, the digital signature (e, s), the salt t and the public key Q' may be sent together or separately. In some cases, the information is sent to a verifier, for instance, as described with respect to operation 218 in FIG. 2.

In the example shown in FIG. 9, the private key d' is known only to the signer (the entity signing the message M), and the secret generator G' and the password are shared secrets known only to the signer, the entity who will verify the digital signature, and possibly one or more other trusted entities. For example, the message recipient may obtain the password and generate the secret generator G' based on the password in the same manner that the signer obtains the password and generates the secret generator G'.

Figure 10:
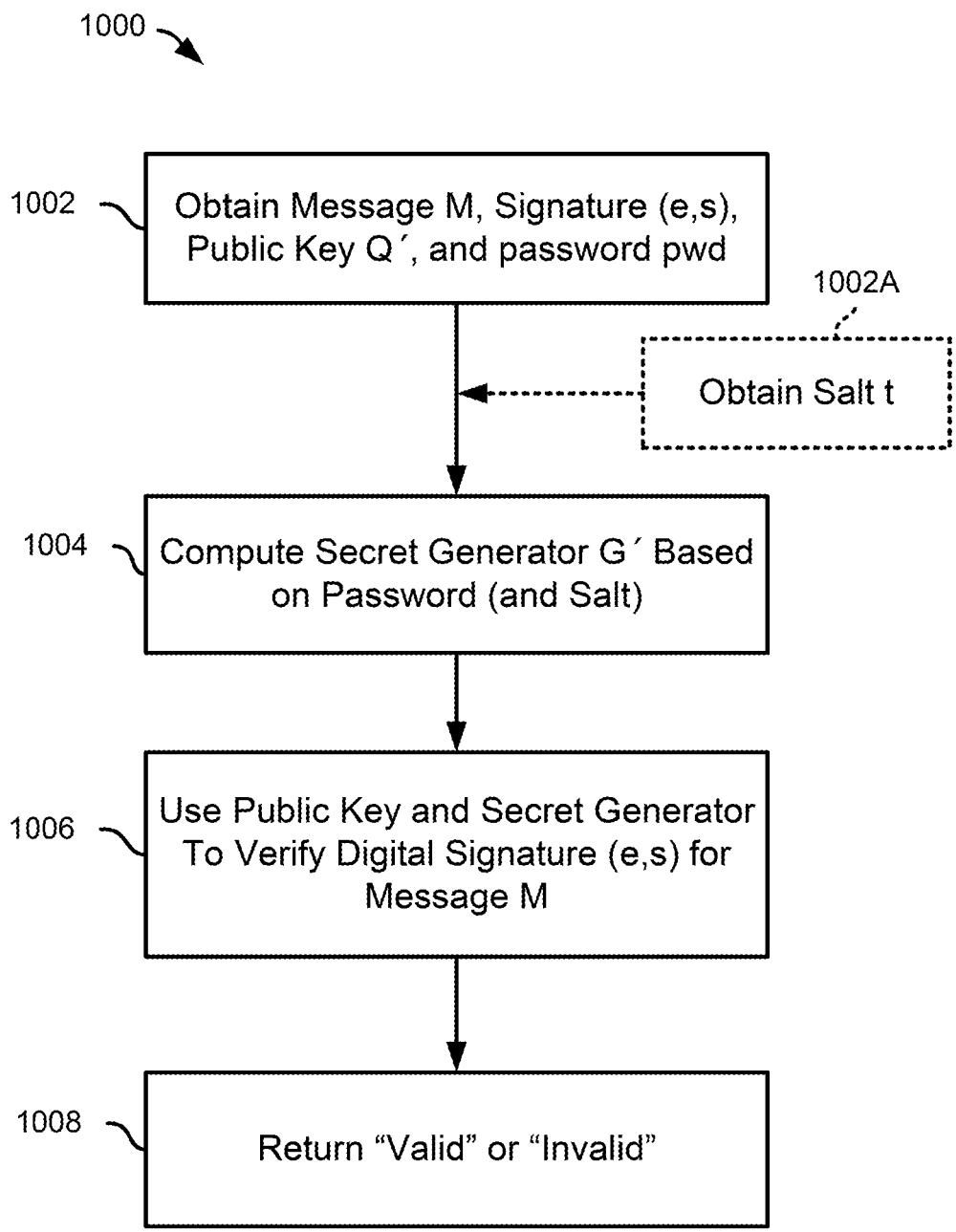
FIG. 10 is a flow diagram showing an example process for verifying a digital signature based on a password.

FIG. 10 is a flow diagram showing an example process 1000 for verifying a digital signature based on a password. For instance, the process 1000 may be used to verify a digital signature generated according to the example process 900 shown in FIG. 9. The example process 1000 can be performed, for example, by a computer system that includes a memory and a processor. For instance, operations in the process 1000 may be performed by either of the nodes 102, 104 in the example communication system 100 shown in FIG. 1 or in another type of system. The example process 1000 may include additional or different operations. In some cases, one or more of the operations shown in FIG. 10 are implemented as processes that include multiple operations, sub-processes for other types of routines. In some cases, operations can be combined, performed in another order, performed in parallel, iterated or otherwise repeated or performed another manner.

In some cases, the operations shown in FIG. 10 can be implemented as a verification function. For example, the verification function may be configured to verify a digital signature. In some implementations, the verification function receives inputs that include a message M, a public key Q', a password pwd and a digital signature (e, s), and the verification function produces outputs that indicate whether the digital signature is valid. A verification function may receive other inputs, produce other outputs or include other operations.

The example process 1000 can be used to verify the digital signature (e, s) generated by the process 900 shown in FIG. 9. In the example shown, the digital signature (e, s) to be verified is associated with a message M from the signing entity (the entity who purportedly generated the digital signature). For example, a verifier may receive the digital signature (e, s) and the associated message M, for instance, as described with respect to operation 220 in FIG. 2. The verifier also obtains one or more public keys of the signer and possibly other information associated with the signer.

At 1002, the message M, the public key Q' of the signer, the password pwd and the digital signature (e, s) are obtained. At 1002A, a salt t is obtained. For example, information may be accessed as inputs, accessed in memory, accessed from another system or otherwise obtained. In some instances, the message M and password pwd obtained at 1002 in FIG. 10 are the same message M and password obtained at 902 in FIG. 9; the public key Q' obtained at 1002 in FIG. 10 is the same public key Q' obtained at 906 in FIG. 9; and the digital signature (e, s) obtained at 1002 in FIG. 10 is the same digital signature (e, s) generated at 908 in FIG. 9. In some instances, if a salt value was used by the signer in the signing process, the salt value obtained at 1002A in FIG. 10 is the same salt value obtained at 902A in FIG. 9.

At 1004, a secret generator G' is computed based on the password and the salt. In the example shown in FIG. 10, the secret generator G' is computed at 1004 according to the same process that was used by the signer (e.g., at 904 in FIG. 9) to generate the secret generator G'. In some cases, the secret generator G' is computed based on the password obtained at 1002 and the salt value obtained at 1002A. In some cases, the secret generator G' is computed based on the password obtained at 1002, and not based on a salt value. The secret generator G' may be generated at 904 according to the example process 800 shown in FIG. 8, or according to another process.

At 1006, the public key Q' is used to verify the digital signature (e, s) based on the message M. For example, the public key Q' may be used to verify the digital signature according to the example process 700 shown in FIG. 7, or according to another process. At 1008, an indication of the validity or invalidity of the digital signature is provided. The indication (e.g., "valid" or "invalid") can be the output provided by the verification process used at 1006. For instance, the indication returned at 1008 in FIG. 10 can be the same as, or can be based on, the indication returned at 710 or 712 in FIG. 7.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a secret generator is used in an Elliptic Curve Cryptography (ECC) digital signature scheme.

In a first example, an elliptic curve cryptography (ECC) digital signature method includes accessing a secret generator $G'$. The secret generator $G'$ is an element of an elliptic curve subgroup $\langle G \rangle$ specified by a public generator $G$ of an elliptic curve cryptography system. The secret generator $G'$ is used to generate, by operation of one or more processors, a key pair comprising a public key $Q'$ and a private key $d'$. The private key $d'$ is used to generate a digital signature $(e, s)$ based on a message M.

Implementations of the first example may include one or more of the following features. The digital signature can be provided for transmission to a message recipient. The secret generator $G'$ can be generated by the signer. Generating the secret generator $G'$ can include using a point decompression function to generate a coordinate pair $(x, y)$; and designating the coordinate pair $(x, y)$ as the secret generator $G'$ based on a determination that the coordinate pair $(x, y)$ belongs to the elliptic curve subgroup $\langle G \rangle$. Generating the secret generator $G'$ can include accessing a secret password; and generating the secret generator $G'$ based on the secret password. Generating the secret generator $G'$ can include obtaining a random integer $\alpha$; and computing the secret generator $G'$ by combining the random integer with the public generator $G$ (e.g., $G' = \alpha G$).

Implementations of the first example may include one or more of the following features. The signer can receive secret generator $G'$ from a trusted third party. The key pair can be generated by obtaining a random integer; designating the random integer as the private key $d'$; and computing the public key $Q'$ by combining the random integer with the secret generator $G'$ (e.g., $Q' = d'G'$). Generating the digital signature $(e, s)$ based on the message M can include using the secret generator $G'$ to obtain an ephemeral key pair $(k', K')$ comprising an ephemeral private key $k'$; using a hash function H to compute a first signature component $e$ (e.g., $e = H(M \| K')$); and using the first signature component $e$, the private key $d'$ and the ephemeral private key $k'$ to generate a second signature component $s$ (e.g., $s = k' - d'e \bmod n$).

In a second example, a system includes a data processing apparatus and a non-transitory computer-readable medium storing instructions that are operable when executed by the data processing apparatus to perform operations. The operations include accessing a secret generator $G'$. The secret generator $G'$ is an element of an elliptic curve subgroup $\langle G \rangle$ specified by a public generator $G$ of an elliptic curve cryptography system. The operations include using the secret generator $G'$ to generate a key pair comprising a public key $Q'$ and a private key $d'$; and using the private key $d'$ to generate a digital signature $(e, s)$ based on a message M.

Implementations of the second example may include one or more of the following features. The system can include a communication interface operable to send the digital signature to a message recipient. The operations can include generating the secret generator $G'$. Generating the secret generator $G'$ can include using a point decompression function to generate a coordinate pair $(x, y)$; and designating the coordinate pair $(x, y)$ as the secret generator $G'$ based on a determination that the coordinate pair $(x, y)$ belongs to the elliptic curve subgroup $\langle G \rangle$. Generating the secret generator $G'$ can include accessing a secret password; and generating the secret generator $G'$ based on the secret password. Generating the secret generator $G'$ can include obtaining a random integer $\alpha$; and computing the secret generator G' by combining the random integer with the public generator G (e.g., G'=αG).

Implementations of the second example may include one or more of the following features. The operations can include receiving the secret generator G' from a trusted third party. The key pair can be generated by obtaining a random integer; designating the random integer as the private key d'; and computing the public key Q' by combining the random integer with the secret generator G' (e.g., Q'=d'G'). Generating the digital signature (e, s) based on the message M can include using the secret generator G' to obtain an ephemeral key pair (k', K') comprising an ephemeral private key k'; using a hash function H to compute a first signature component e (e.g., e=H(M||K')); and using the first signature component e, the private key d' and the ephemeral private key k' to generate a second signature component s. (e.g., s=k'−d'e mod n).

In a third example, an elliptic curve cryptography (ECC) signature verification method includes accessing a secret generator G' selected from an elliptic curve subgroup ⟨ G⟩ . The elliptic curve subgroup ⟨ G⟩ is specified by a public generator G of an elliptic curve cryptography system. A public key Q' of an entity is accessed. By operation of one or more processors, the public key Q' and the secret generator G' are used to verify a digital signature (e, s) associated with a message M from the entity.

Implementations of the third example may include one or more of the following features. The verifier can receive the digital signature and the message from the entity. The verifier can generate the secret generator G'. Generating the secret generator G' can include using a point decompression function to generate a coordinate pair (x, y); and designating the coordinate pair (x, y) as the secret generator G' based on a determination that the coordinate pair (x, y) belongs to the elliptic curve subgroup ⟨ G⟩ . Generating the secret generator G' can include accessing a secret password; and generating the secret generator G' based on the secret password. Generating the secret generator G' can include obtaining a random integer α; and computing the secret generator G' by combining the random integer with the public generator G (e.g., G'=αG).

Implementations of the third example may include one or more of the following features. The verifier can receive the secret generator G' from a trusted third party. The public key Q' can be based on the secret generator G' and a private key d' of the entity (e.g., Q'=d'G'). Verifying the digital signature can include computing an elliptic curve point K' based on the secret generator, the public key Q' and the digital signature (e, s); computing a check value e' based on the elliptic curve point K' and the message; and comparing a component e of the digital signature with the check value e' modulo an integer n.

In a fourth example, a system includes a data processing apparatus and a non-transitory computer-readable medium storing instructions that are operable when executed by the data processing apparatus to perform operations. The operations include accessing a secret generator G' selected from an elliptic curve subgroup ⟨ G⟩ . The elliptic curve subgroup ⟨ G⟩ is specified by a public generator G of an elliptic curve cryptography system. The operations include accessing a public key Q' of an entity; and using the public key Q' and the secret generator G' to verify a digital signature (e, s) associated with a message M from the entity.

Implementations of the fourth example may include one or more of the following features. The system includes a communication interface operable to receive the digital signature and the message from the entity. The operations include generating the secret generator G'. Generating the secret generator G' can include using a point decompression function to generate a coordinate pair (x, y); and designating the coordinate pair (x, y) as the secret generator G' based on a determination that the coordinate pair (x, y) belongs to the elliptic curve subgroup ⟨ G⟩ . Generating the secret generator G' can include accessing a secret password; and generating the secret generator G' based on the secret password. Generating the secret generator G' can include obtaining a random integer α; and computing the secret generator G' by combining the random integer with the public generator G (e.g., G'=αG).

Implementations of the fourth example may include one or more of the following features. The operations include receiving the secret generator G' from a trusted third party. The public key Q' can be based on the secret generator G' and a private key d' of the entity (e.g., Q'=d'G'). Verifying the digital signature can include computing an elliptic curve point K' based on the secret generator, the public key Q' and the digital signature (e, s); computing a check value e' based on the elliptic curve point K' and the message; and comparing a component e of the digital signature with the check value e' modulo an integer n.

In a fifth example, an elliptic curve cryptography (ECC) method includes, by operation of one or more processors, using a point decompression function to generate a coordinate pair (x, y) based on a secret password. The coordinate pair (x, y) represents an elliptic curve point. The elliptic curve point is designated as a secret generator G' based on a determination that the elliptic curve point is an element of an elliptic curve subgroup ⟨ G⟩ . The elliptic curve subgroup ⟨ G⟩ is specified by a public generator G of an elliptic curve cryptography system. The secret generator G' is used to perform cryptography operations.

Implementations of the fifth example may include one or more of the following features. The coordinate pair (x, y) can include an x-coordinate and a y-coordinate. Using the point decompression function to generate the coordinate pair (x, y) can include obtaining a sign bit τ and the x-coordinate by applying a pseudo-random function to the password; determining a first candidate y-coordinate $y_1$ and a second candidate y-coordinate $y_2$ by solving a quadratic equation based on the x-coordinate; and selecting the y-coordinate from the first and second candidate y-coordinates based on the sign bit τ. The sign bit τ and the x-coordinate can be obtained by applying a pseudo-random function to the secret password and a salt value.

Implementations of the fifth example may include one or more of the following features. The secret password using a synchronized identification token. The secret generator is used to perform cryptography operations that include generating a digital signature of a message. The secret generator is used to perform cryptography operations that include verifying a digital signature of a message.

In a sixth example, a system includes a data processing apparatus; and a non-transitory computer-readable medium storing instructions that are operable when executed by the data processing apparatus to perform operations. The operations include using a point decompression function to generate a coordinate pair (x, y) based on a secret password. The coordinate pair (x, y) represents an elliptic curve point. The operations include designating the elliptic curve point as a secret generator G' based on a determination that the elliptic curve point is an element of an elliptic curve subgroup ⟨ G⟩ . The elliptic curve subgroup ⟨ G⟩ is specified by a public generator G of an elliptic curve cryptography system.

The operations include using the secret generator G' to perform cryptography operations.

Implementations of the sixth example may include one or more of the following features. The coordinate pair (x, y) can include an x-coordinate and a y-coordinate. Using the point decompression function to generate the coordinate pair (x, y) can include obtaining a sign bit τ and the x-coordinate by applying a pseudo-random function to the password; determining a first candidate y-coordinate $y_1$ and a second candidate y-coordinate $y_2$ by solving a quadratic equation based on the x-coordinate; and selecting the y-coordinate from the first and second candidate y-coordinates based on the sign bit τ. The sign bit τ and the x-coordinate can be obtained by applying a pseudo-random function to the secret password and a salt value.

Implementations of the sixth example may include one or more of the following features. The secret password using a synchronized identification token. The secret generator is used to perform cryptography operations that include generating a digital signature of a message. The secret generator is used to perform cryptography operations that include verifying a digital signature of a message.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. An elliptic curve cryptography (ECC) digital signature method comprising:
   generating a shared secret generator, the shared secret generator being known to a signer and a verifier, the shared secret generator being an element of an elliptic curve subgroup specified by a public generator of an elliptic curve cryptography system, wherein generating the shared secret generator comprises:
      using a point decompression function to generate a coordinate pair; and
      designating the coordinate pair as the shared secret generator based on a determination that the coordinate pair belongs to the elliptic curve subgroup;
   using the shared secret generator to generate, by operation of one or more processors, a key pair of the signer, the key pair of the signer comprising a public key and a private key;
   using the private key to generate a digital signature of the signer based on a message; and
   providing the digital signature of the signer for transmission to the verifier, the digital signature enabling the verifier to verify authenticity of the message.

2. The ECC digital signature method of claim 1, further comprising receiving the shared secret generator from a trusted third party.

3. The ECC digital signature method of claim 1, wherein generating the key pair of the signer comprises:
   obtaining a random integer;
   designating the random integer as the private key; and
   computing the public key by combining the random integer with the shared secret generator.

4. The ECC digital signature method of claim 1, wherein generating the digital signature of the signer based on the message comprises:
   using the shared secret generator to obtain an ephemeral key pair comprising an ephemeral private key;
   using a hash function to compute a first signature component; and
   using the first signature component, the private key and the ephemeral private key to generate a second signature component.

5. A system comprising:
   a data processing apparatus;
   a non-transitory computer-readable medium storing instructions that when executed by the data processing apparatus perform operations comprising:
      generating a shared secret generator, the shared secret generator being known to a signer and a verifier, the shared secret generator being an element of an elliptic curve subgroup specified by a public generator of an elliptic curve cryptography system, wherein generating the shared secret generator comprises:
         using a point decompression function to generate a coordinate pair; and
         designating the coordinate pair as the shared secret generator based on a determination that the coordinate pair belongs to the elliptic curve subgroup;
      using the shared secret generator to generate a key pair of the signer, the key pair of the signer comprising a public key and a private key; and
      using the private key to generate a digital signature of the signer based on a message; and
   a communication interface that sends the digital signature of the signer to the verifier, the digital signature enabling the verifier to verify authenticity of the message.

6. The system of claim 5, the operations further comprising receiving the shared secret generator from a trusted third party.

7. The system of claim 5, wherein generating the key pair of the signer comprises:
   obtaining a random integer;
   designating the random integer as the private key; and
   computing the public key by combining the random integer with the shared secret generator.

8. The system of claim 5, wherein generating the digital signature of the signer based on the message comprises:
   using the shared secret generator to obtain an ephemeral key pair comprising an ephemeral private key;
   using a hash function to compute a first signature component; and
   using the first signature component, the private key and the ephemeral private key to generate a second signature component.

9. An elliptic curve cryptography (ECC) signature verification method comprising:
- receiving a digital signature of a signer, the digital signature of the signer being associated with a message;
- generating a shared secret generator selected from an elliptic curve subgroup, the shared secret generator known to the signer and a verifier, the elliptic curve subgroup specified by a public generator of an elliptic curve cryptography system, wherein generating the shared secret generator comprises:
  - using a point decompression function to generate a coordinate pair; and
  - designating the coordinate pair as the shared secret generator based on a determination that the coordinate pair belongs to the elliptic curve subgroup;
- accessing a public key of the signer; and
- by operation of one or more processors, using the public key of the signer and the shared secret generator to verify the digital signature of the signer.

10. The ECC signature verification method of claim 9, further comprising receiving the shared secret generator from a trusted third party.

11. The ECC signature verification method of claim 9, wherein the public key of the signer is based on the shared secret generator and a private key of the signer.

12. The ECC signature verification method of claim 9, wherein verifying the digital signature of the signer comprises:
- computing an elliptic curve point based on the shared secret generator, the public key of the signer and the digital signature of the signer;
- computing a check value based on the elliptic curve point and the message; and
- comparing a component of the digital signature of the signer with the check value modulo an integer.

13. A system comprising:
- a data processing apparatus;
- a communication interface that receives a digital signature of a signer, the digital signature of the signer associated with a message;
- a non-transitory computer-readable medium storing instructions that when executed by the data processing apparatus perform operations comprising:
  - generating a shared secret generator selected from an elliptic curve subgroup, the shared secret generator known to the signer and a verifier, the elliptic curve subgroup specified by a public generator of an elliptic curve cryptography system, wherein generating the shared secret generator comprises:
    - using a point decompression function to generate a coordinate pair; and
    - designating the coordinate pair as the shared secret generator based on a determination that the coordinate pair belongs to the elliptic curve subgroup;
  - accessing a public key of the signer; and
  - using the public key of the signer and the shared secret generator to verify the digital signature of the signer.

14. The system of claim 13, the operations further comprising receiving the shared secret generator from a trusted third party.

15. The system of claim 13, wherein the public key of the signer is based on the shared secret generator and a private key of the signer.

16. The system of claim 13, wherein verifying the digital signature of the signer comprises:
- computing an elliptic curve point based on the shared secret generator, the public key of the signer and the digital signature of the signer;
- computing a check value based on the elliptic curve point and the message; and
- comparing a component of the digital signature of the signer with the check value modulo an integer.

* * * * *